US012756881B1

(12) United States Patent
Tamaki

(10) Patent No.: US 12,756,881 B1
(45) Date of Patent: Oct. 6, 2026

(54) CONTEXT-TRIGGERED PROACTIVE MEDIA PLAYBACK SYSTEM

(71) Applicant: Music IP Holdings (MIH), Inc., Charleston, SC (US)

(72) Inventor: Ichiro Tamaki, Charleston, SC (US)

(73) Assignee: Music IP Holdings, Inc., Nashville, TN (US)

(*) Notice: Subject to any disclaimer, the term of this patent is extended or adjusted under 35 U.S.C. 154(b) by 0 days.

(21) Appl. No.: 19/537,995

(22) Filed: Feb. 12, 2026

(51) Int. Cl.
*H04N 21/25* (2011.01)
*G06F 16/735* (2019.01)
*H04N 21/2387* (2011.01)

(52) U.S. Cl.
CPC ......... *H04N 21/251* (2013.01); *G06F 16/735* (2019.01); *H04N 21/2387* (2013.01)

(58) Field of Classification Search
CPC . H04N 21/251; H04N 21/2387; G06F 16/735
See application file for complete search history.

(56) References Cited

U.S. PATENT DOCUMENTS 11,003,710 B2 5/2021 O'Driscoll et al.
11,138,262 B2 10/2021 Aryan
2014/0277648 A1 9/2014 Chong et al.
2014/0277649 A1* 9/2014 Chong .............. G06F 16/90324 700/94
2016/0371371 A1 12/2016 Chong et al.
2022/0116685 A1* 4/2022 Patricks ............. H04N 21/4755

FOREIGN PATENT DOCUMENTS

WO 2016156553 A1 10/2016

* cited by examiner

*Primary Examiner* — Thomas H Maung

(57) ABSTRACT

Certain aspects of the disclosure provide systems, methods, and non-transitory computer-readable media for proactive media curation using an on-device autonomous agent. A mobile device collects ambient context data via sensors and detects a composite event trigger based on a conjunction of conditions such as geofence exit, activity transition, and velocity threshold. The mobile device encodes the context data into a context vector and performs a first similarity search in a history space of a device-resident vector database to retrieve preference vectors. The mobile device computes a target media profile vector and performs a second similarity search in a catalog space to identify matching media vectors. The mobile device issues a playback request to an external media service without receiving an explicit user interface command. All processing occurs on-device using approximate nearest neighbor indices, preserving user privacy while achieving sub-50 millisecond decision latency.

18 Claims, 8 Drawing Sheets

CONTEXT-TRIGGERED PROACTIVE MEDIA PLAYBACK SYSTEM

BACKGROUND

Field

Aspects of the present disclosure relate to context-aware computing, and more particularly to context-aware computing and autonomous artificial intelligence agents.

Description of Related Art

Modern media recommendation systems leverage contextual signals such as time of day, geographic location, and historical user preferences to suggest content that may align with a user's interests. These systems have become increasingly sophisticated in their ability to analyze user behavior patterns and environmental factors to generate relevant recommendations. However, despite advances in recommendation accuracy, conventional systems remain fundamentally reactive in their operational paradigm. Users must navigate graphical user interfaces, review presented options, and affirmatively select content for playback. This interaction model, while suitable for sedentary use cases, presents significant usability limitations in scenarios where manual device interaction is impractical, inconvenient, or unsafe, such as during physical exercise, vehicle operation, or other hands-occupied activities.

Existing approaches to context-aware media services predominantly rely on cloud-based architectures for processing and inference. In such systems, rich contextual data collected from device sensors, including motion telemetry, ambient audio characteristics, location coordinates, and device state information, is transmitted to remote servers where computationally intensive analysis occurs. While cloud infrastructure offers substantial processing capabilities, this architectural choice introduces several technical disadvantages. Continuous or frequent transmission of sensor data to remote servers consumes significant network bandwidth and increases operational latency between context changes and system responses. Battery consumption on mobile devices escalates due to sustained radio activity required for data transmission. Furthermore, transmitting granular sensor data, particularly audio samples and precise location information, raises substantial privacy concerns, as sensitive contextual information about user activities and environments leaves the controlled device boundary.

Additionally, the latency inherent in cloud-based round-trip communications diminishes the perceived responsiveness of context-aware systems. When environmental conditions change rapidly, the delay between context acquisition, transmission, remote processing, and response delivery may result in recommendations or actions that no longer align with the user's current situation. Polling-based architectures that periodically sample context and query remote services further compound power consumption issues and fail to provide the immediacy users expect from intelligent assistive systems. These limitations collectively indicate a need for alternative approaches to context-aware media curation that can address efficiency, responsiveness, and privacy considerations.

SUMMARY

Certain aspects provide a computing system for proactive media curation. In some aspects, the computing system may include a mobile device that has one or more processors, a memory, and at least one sensor configured to provide ambient context data. In some aspects, ambient context data may include sensor readings and device state information that characterize a user's current situation, such as location, physical activity, velocity, ambient sound levels, Bluetooth connection state, and/or charging state. A device-resident vector database stored in the memory may comprise a history space storing associations between context vectors and preference vectors and a catalog space storing media vectors. In some aspects, the history space captures learned relationships between past user contexts and the media characteristics the user preferred in those contexts. In some implementations, the catalog space contains vector representations of available media items, where each vector encodes audio features such as tempo, energy, and/or mood. The one or more processors are configured to detect a composite event trigger based on the ambient context data. For example, a composite event trigger may refer to a conjunction of two or more conditions that, when satisfied together, indicate a suitable moment for proactive media playback. The one or more processors are further configured to encode the ambient context data into a context vector, perform a first similarity search in the history space using the context vector to retrieve one or more preference vectors, compute a target media profile vector from the one or more preference vectors, perform a second similarity search in the catalog space using the target media profile vector to identify one or more media vectors, and issue, without receiving an explicit user interface command, a playback request to an external media service to initiate media playback corresponding to the identified one or more media vectors.

Certain aspects provide a method for proactive media curation. The method may include collecting, via at least one sensor of a mobile device, ambient context data. The method further includes detecting a composite event trigger based on the ambient context data. The method further includes encoding the ambient context data into a context vector, where the context vector is a fixed-length numerical representation of the user's current situational state. The method further includes performing a first similarity search in a history space of a device-resident vector database to retrieve one or more preference vectors. The method further includes computing a target media profile vector from the one or more preference vectors, where the target media profile vector represents desired media characteristics based on learned user preferences and optional constraints such as tempo range, energy level, or mood. The method further includes performing a second similarity search in a catalog space of the device-resident vector database to identify one or more media vectors. The method further includes issuing, without receiving an explicit user interface command, a playback request to an external media service to initiate media playback corresponding to the identified one or more media vectors.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
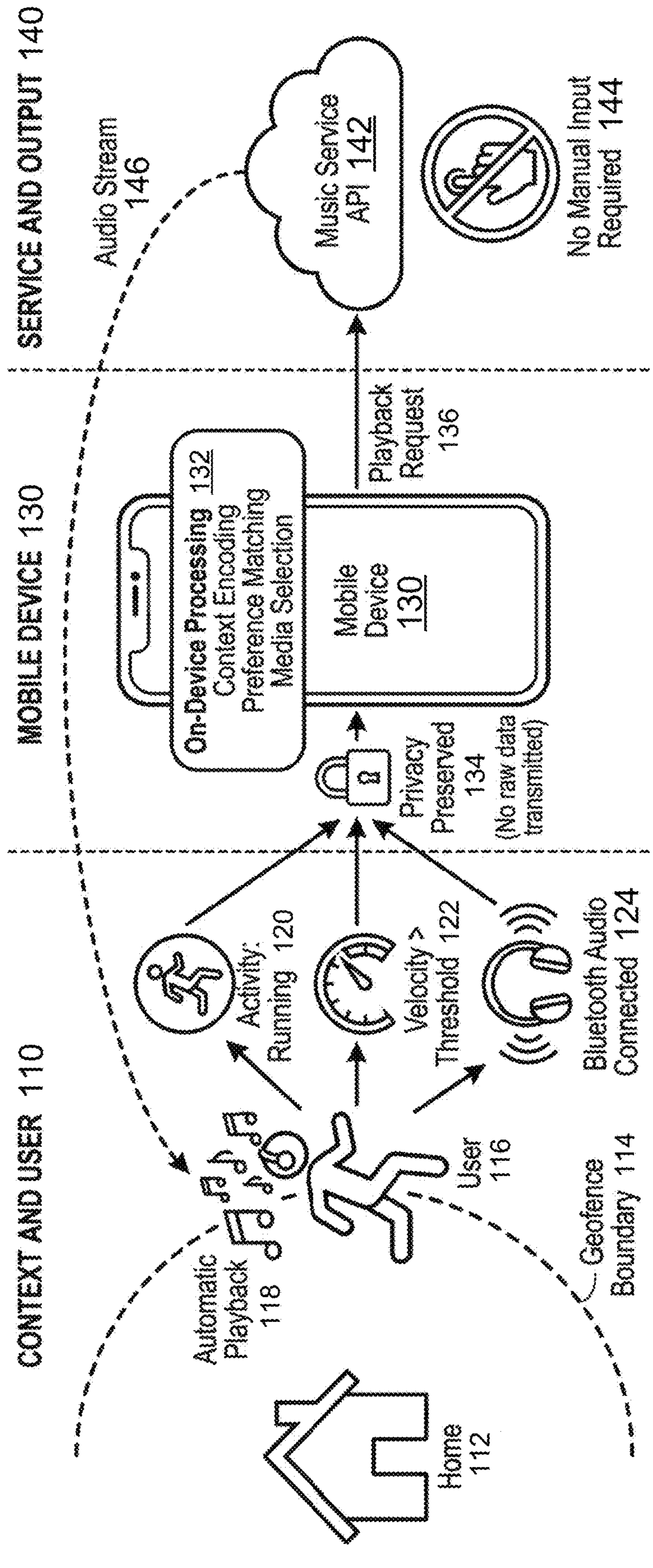
FIG. 1 illustrates an operational concept diagram for proactive media curation, in accordance with aspects of the present disclosure.

Aspects of the present disclosure provide apparatuses, methods, processing systems, and computer-readable mediums for proactive media curation using an on-device autonomous agent that performs context-aware media selection and initiates playback without explicit user interaction.

Modern users increasingly consume media during physical activities such as running, cycling, or driving. In these scenarios, users often desire music or other audio content that matches their current activity and mood. However, interacting with a mobile device to browse and select media is impractical or unsafe during such activities. Users may be unable to look at a screen, navigate menus, or provide explicit input while in motion. This creates a gap between the user's desire for contextually appropriate media and their ability to request it through conventional interfaces.

Conventional media recommendation systems address this gap inadequately. These systems typically operate in a reactive manner, presenting recommendations through a graphical user interface and waiting for the user to make a selection. Even voice-activated systems require the user to initiate a request and verbally specify preferences. This reactive approach fails when user interaction is infeasible or inconvenient.

Furthermore, existing approaches that attempt to understand user context often rely on cloud-based processing. These systems continuously stream sensor data, location information, and other context signals to remote servers for analysis. This architecture introduces several technical challenges. Network transmission of rich context data consumes significant bandwidth and battery power. Latency between context change and system response degrades user experience. Perhaps most significantly, transmitting raw sensor data including audio samples and precise location coordinates raises substantial privacy concerns.

Aspects of the present disclosure address these technical challenges through an on-device autonomous agent architecture that performs context understanding, preference matching, and/or media selection at the user's mobile device. In some aspects, the context understanding, preference matching, and/or media selection may be performed entirely on the user's mobile device. The agent may monitor ambient context data from device sensors including location, motion, velocity, ambient sound levels, and/or device connection states. When the agent detects a meaningful combination of context signals indicating a suitable moment for media playback, it initiates media selection and playback without waiting for user input.

At least one technical aspect involves composite event triggering. Rather than responding to a single context change, the agent evaluates a conjunction of multiple heterogeneous conditions before activating. For example, the agent may activate when detecting that the user has exited a home geofence, transitioned to a running activity, exceeded a velocity threshold, and/or connected Bluetooth headphones. This multi-condition approach reduces false activations that might occur from transient or ambiguous context signals. The agent may apply hysteresis to threshold-based conditions and require sustained satisfaction over a time window, providing reliable trigger detection even in noisy sensor environments.

At least one technical aspect involves two-stage local vector search for media selection. The agent may maintain a device-resident vector database with two distinct spaces. A history space stores learned associations between past contexts and user preferences. A catalog space stores vector representations of available media items. When activated, the agent encodes the current context into a vector representation and searches the history space to retrieve preference vectors reflecting what the user enjoyed in similar past situations. The agent then generates a target media profile and searches the catalog space to identify matching media. This two-stage approach enables personalized, context-aware selection without transmitting user data off-device.

At least one technical aspect involves privacy-preserving context processing. The agent may operate on privacy-reduced representations of sensor data rather than raw signals. For example, ambient audio is processed to extract aggregate sound pressure levels in decibels, with raw audio frames immediately discarded. In some aspects, sound pressure levels represent aggregate loudness measurements that indicate ambient sound intensity without capturing or retaining intelligible audio content. Location data is bucketized into coarse regions rather than retained as precise coordinates. In some aspects, all context encoding, vector search, and preference learning occurs on-device. That is, in some aspects, raw context data or detailed user behavior patterns are not transmitted to external servers.

At least one technical aspect involves energy-efficient operation. Mobile devices have constrained battery capacity, and continuous sensor processing can rapidly deplete available power. The agent addresses this through event-triggered activation rather than continuous polling. The agent may remain in a low-power suspended state until the operating system signals a potential trigger event. Upon activation, the agent may perform processing within a strictly bounded time slice, then returns to suspension. This duty-cycled operation enables responsive context awareness while minimizing battery consumption.

In some implementations, the autonomous headless agent transitions among operational states including an idle state, an active state, and a suspended state. The idle state and suspended state may be used interchangeably herein to refer to a low-power operational mode in which the agent awaits trigger events while consuming minimal system resources. In some aspects, the agent transitions from the idle state to the active state in response to an operating system broadcast indicating detection of trigger conditions. In the active state, the agent performs context encoding, similarity search, and playback request issuance. In some implementations, the agent returns to the idle state after completing processing tasks, thereby conserving battery power through event-driven state management rather than continuous polling.

At least one technical aspect involves safety and consent enforcement. Proactive systems that act without explicit user commands raise concerns about unwanted or inappropriate behavior. The agent may enforce configurable policies that gate automatic playback. The agent verifies user consent, respects quiet hours, and/or confirms appropriate device states before initiating playback. When conditions warrant caution, the agent may present a notification or preview rather than immediately starting full playback.

The technical solutions described herein provide several concrete benefits. The on-device processing architecture eliminates or reduces network round-trips for context analysis, enabling sub-50 millisecond response from trigger detection to playback initiation. This immediacy creates a seamless experience where media begins as the user starts an activity. The local vector search approach may reduce network bandwidth consumption by more than 90 percent compared to cloud-based alternatives that stream context data for remote processing. The energy-efficient activation model may reduce battery drain by more than 25 percent compared to polling-based context monitoring. The privacy-preserving design may protect sensitive user information including location patterns, activity habits, and/or audio environment characteristics. The composite trigger mechanism with hysteresis and temporal validation may achieve reliable activation with minimal false positives. Together, these technical improvements enable a class of proactive, context-aware media experiences that were previously impractical on mobile devices.

FIG. 1 illustrates an operational concept diagram 100 for proactive media curation, in accordance with aspects of the present disclosure. In the illustrated example, the diagram 100 depicts three functional zones: a context and user zone 110, a mobile device zone 130, and a service and output zone 140. The context and user zone 110 represents an environment in which a user 116 generates ambient context data through physical activity and device interactions. The user 116 may carry or wear a mobile device (shown in mobile device zone 130) that collects the ambient context data. Ambient context data may include sensor readings and operating system events that characterize the user's current situation. For example, ambient context data may include location information, motion telemetry, device connection states, and environmental measurements.

The home 112 represents a geographic reference point associated with a geofence boundary 114. In some aspects, the geofence boundary 114 defines a spatial region around the home 112. A geofence may be a virtual perimeter for a real-world geographic area. In some implementations, the mobile device detects when the user 116 crosses the geofence boundary 114. In some aspects, the geofence boundary 114 may be configured with a radius hysteresis of at least 25 meters to suppress false trigger events caused by GPS drift or signal fluctuations. Thus, the mobile device may reduce false positive detections by applying hysteresis to geofence boundary crossings.

The user 116 may engage in physical activity that generates motion-related context signals. For example, an activity indicator 120 represents detection of a running activity. Activity detection may be performed by on-device activity recognition services that classify motion patterns from accelerometer and gyroscope data. For example, activity transitions may include transitions from stationary to walking, walking to running, or stationary to cycling. In some aspects, the mobile device detects an activity transition to running as one condition of a composite event trigger.

As another example, a velocity indicator 122 represents detection that the user's velocity exceeds a threshold. The velocity threshold may be set to a value such as 8 kilometers per hour. In some aspects, the mobile device applies a velocity hysteresis of at least 1 kilometer per hour to prevent oscillation around the threshold value. Thus, the mobile device may suppress spurious trigger events by requiring the velocity to exceed the threshold by a margin before activating.

In some aspects, a Bluetooth audio indicator 124 represents detection of a connected Bluetooth audio device. Bluetooth audio devices may include wireless headphones, earbuds, and speakers. In some implementations, the mobile device detects Bluetooth connection state changes through operating system broadcasts. In some aspects, the Bluetooth connection state serves as a device-state predicate that may be satisfied before issuing a playback request.

The mobile device zone 130 depicts a mobile device 130 that performs on-device processing 132. In the illustrated example, the on-device processing 132 includes context encoding, preference matching, and media selection. In some aspects, context encoding transforms the ambient context data into a context vector. In some aspects, preference matching performs a first similarity search in a history space to retrieve one or more preference vectors. In some aspects, media selection performs a second similarity search in a catalog space to identify one or more media vectors. In some implementations, the on-device processing 132 achieves an end-to-end decision latency of less than 50 milliseconds from detection of a composite event trigger to issuance of a playback request.

A privacy indicator 134 represents that the mobile device 130 preserves user privacy. In some aspects, the mobile device 130 processes ambient context data exclusively on-device. In some implementations, raw context data is not transmitted off-device. For example, the mobile device 130 may discard raw audio frames and retain only logarithmic sound pressure levels. Additionally, or alternatively, the mobile device 130 may bucketize location data rather than transmitting precise coordinates. Thus, the mobile device 130 may protect user privacy by processing privacy-reduced representations locally.

In some aspects, the mobile device 130 detects a composite event trigger based on the ambient context data. A composite event trigger may be a conjunction of at least two conditions that are satisfied simultaneously. For example, FIG. 1 depicts a composite event trigger comprising: (i) a geofence exit (crossing geofence boundary 114 away from home 112), (ii) an activity transition to running (activity indicator 120), (iii) a velocity exceeding a threshold (velocity indicator 122), and (iv) a Bluetooth audio device connected (Bluetooth audio indicator 124). In some aspects, the composite event trigger comprises a conjunction of two conditions. In some aspects, the composite event trigger comprises a conjunction of three conditions. In some aspects, the composite event trigger comprises a conjunction of four or more conditions. The conditions described herein are illustrative examples, and the composite event trigger may include other conditions not explicitly enumerated, such as calendar events, time of day, weather conditions, heart rate, or application state. In some aspects, detection of the composite event trigger employs hysteresis and debounce windows to suppress false positives. In some aspects, detection of the composite event trigger involves sustained satisfaction of trigger conditions for a time window between 3 seconds and 10 seconds.

In some implementations, the mobile device 130 issues a playback request 136 to an external media service. In some aspects, the playback request 136 is issued without receiving an explicit user interface command. In some aspects, the mobile device 130 executes an autonomous headless agent that operates as a background service without graphical user interface interaction. A headless agent is a software component that performs tasks without presenting a visible user interface or requiring direct user input. As used herein, reference to an autonomous headless agent may refer to one or more autonomous headless agents, where each autonomous headless agent may perform one or more of the tasks described herein. For example, a first autonomous headless agent may perform context monitoring and trigger detection, while a second autonomous headless agent may perform context encoding and similarity search. Alternatively, a single autonomous headless agent may perform all tasks. The autonomous headless agent operates independently of foreground applications and does not require the user to launch an application, navigate menus, or interact with on-screen controls. In some implementations, the autonomous headless agent registers with the operating system to receive broadcasts corresponding to context changes, such as geofence transitions, activity recognition updates, or Bluetooth connection events. The autonomous headless agent may be awakened by an operating system broadcast upon detection of the composite event trigger. Upon awakening, the autonomous headless agent performs context encoding, similarity search, and playback request issuance within a bounded time window before returning to a suspended state. In some aspects, the autonomous headless agent consumes minimal system resources while suspended and activates only when trigger conditions are detected. Thus, the mobile device 130 may initiate media playback proactively without manual user input, enabling seamless media experiences during activities when user interaction with the device is impractical or unsafe.

In some aspects, issuing the playback request 136 is preceded by a confirmation backoff interval during which the composite event trigger is reevaluated. The confirmation backoff interval may refer to a brief waiting period after initial trigger detection during which the mobile device 130 verifies that the trigger conditions continue to be satisfied before committing to playback initiation. The confirmation backoff interval may be between 1 second and 2 seconds. In some implementations, the confirmation backoff interval may be shorter than 1 second or longer than 2 seconds depending on the specific trigger conditions and application requirements. For example, a user may momentarily satisfy trigger conditions by briefly jogging to catch a bus while leaving home, but then stop running upon boarding the bus. Without a confirmation backoff interval, the mobile device 130 might initiate workout music playback inappropriately. By reevaluating the trigger conditions after the confirmation backoff interval, the mobile device 130 can detect that the running activity has ceased and suppress the playback request. In another example, GPS signal fluctuations near a geofence boundary may cause transient threshold crossings that do not represent genuine user movement. The confirmation backoff interval allows such transient fluctuations to settle before the mobile device 130 commits to action. In some aspects, if any trigger condition becomes unsatisfied during the confirmation backoff interval, the mobile device 130 aborts the playback request and returns to monitoring. In some aspects, the confirmation backoff interval is configurable by the user or adjusted dynamically based on historical false positive rates. Thus, the mobile device 130 may suppress false positives by confirming that trigger conditions remain satisfied before issuing the playback request 136, improving user experience by avoiding unwanted or contextually inappropriate media playback.

In some aspects, the mobile device 130 enforces a safety and consent policy prior to issuing the playback request 136. The safety and consent policy may gate the playback request 136 upon verifying that: (i) a user consent flag is enabled, (ii) a current time is outside a quiet hours interval, and/or (iii) a device-state predicate is satisfied. The device-state predicate may comprise at least one of: a Bluetooth audio device is connected, the device is charging, or a device display is off. In some aspects, a safety mode causes preview playback or notification instead of automatic playback.

The service and output zone 140 depicts a music service API 142 that receives the playback request 136. In some aspects, the music service API 142 is an external media service that provides media content. The music service API 142 may be provided by a third-party streaming platform, a proprietary music service, or a local media server accessible over a network. In some implementations, the music service API 142 exposes programmatic endpoints that allow the mobile device 130 to control playback without user interaction with the streaming service's native application. The playback request 136 may comprise one of: a start playback command, a resume playback command, a queue creation command, or a playlist generation command. A start playback command instructs the music service API 142 to begin playing a specified track, album, or artist from the beginning. For example, the mobile device 130 may issue a start playback command to play a high-energy workout playlist identified through the two-stage similarity search. A resume playback command instructs the music service API 142 to continue playing from a previously paused position. For example, if the user paused an audiobook before arriving home and later departs for another activity, the mobile device 130 may issue a resume playback command to continue from where the user left off. A queue creation command instructs the music service API 142 to populate a playback queue with an ordered list of media identifiers. For example, the mobile device 130 may identify ten tracks matching the target media profile vector and transmit the corresponding media identifiers as a queue for sequential playback. A playlist generation command instructs the music service API 142 to create a dynamic playlist based on specified parameters, such as seed tracks, genres, or mood attributes. For example, the mobile device 130 may transmit the target media profile vector constraints to the music service API 142, which then generates a personalized playlist satisfying those constraints from its catalog. In some aspects, the playback request 136 may include additional parameters such as shuffle mode, repeat mode, target playback device, or initial volume level. In some implementations, the music service API 142 acknowledges the playback request 136 and returns status information indicating successful playback initiation or an error condition requiring fallback handling. Thus, the mobile device 130 may control media playback through diverse command types that accommodate different user scenarios and content consumption patterns.

In some implementations, the music service API 142 returns an audio stream 146 in response to the playback request 136. The music service API 142 may be a cloud-based streaming service that hosts a catalog of media content and provides programmatic access for playback control. In some aspects, the audio stream 146 delivers media content to the user 116. The audio stream 146 may comprise compressed audio data transmitted over a network connection, such as Wi-Fi or cellular, and decoded by the mobile device 130 for playback. In the illustrated example, the user 116 receives automatic playback 118 through the connected Bluetooth audio device (e.g., wireless headphones). The automatic playback 118 represents media playback that initiates without explicit user interface interaction. For example, a user leaving home for a morning run may experience music playback beginning automatically through their wireless earbuds moments after crossing the geofence boundary and reaching running pace, without ever touching the mobile device 130 or issuing a voice command. In another example, a user beginning a cycling commute may hear a curated playlist start playing through their Bluetooth helmet speakers as the mobile device 130 detects the combination of geofence exit, cycling activity, and connected audio device. In some aspects, the automatic playback 118 may route audio through alternative output paths, such as a wired headphone connection, the mobile device speaker, or a connected vehicle audio system via Bluetooth or auxiliary cable. In some implementations, the mobile device 130 adjusts playback volume automatically based on ambient noise levels or user preferences associated with the detected activity. In some aspects, the automatic playback 118 continues until the user manually stops playback, the detected activity ends, or the media queue is exhausted. Thus, the user 116 experiences seamless, hands-free media enjoyment that adapts to their current context and activity.

A no manual input indicator 144 indicates that the proactive media curation system may initiate playback without explicit user interface commands. Thus, the mobile device 130 may improve user experience during physical activities by automatically curating and playing media based on detected context without the user 116 interacting with a graphical user interface.

Figure 2:
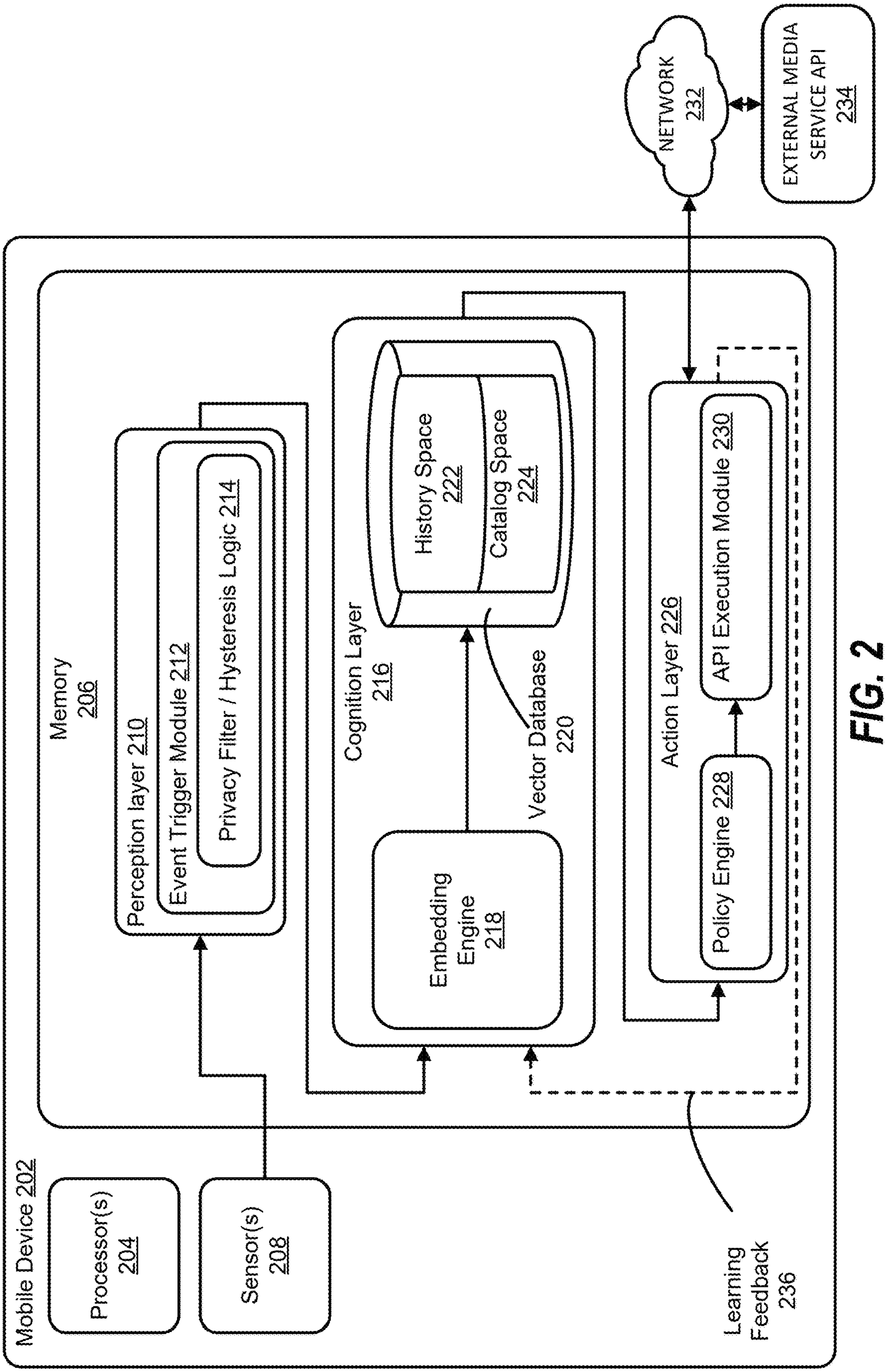
FIG. 2 illustrates a system architecture block diagram for an on-device autonomous agent, in accordance with aspects of the present disclosure.

FIG. 2 illustrates a system architecture diagram 200 for an on-device autonomous agent according to aspects of the present disclosure. In the illustrated example, the system architecture diagram 200 depicts a mobile device 202 that communicates with external services 234 via a network 232.

The mobile device 202 includes one or more processors 204, one or more sensors 208, and one or more memories 206. In some aspects, the one or more processors 204 execute instructions stored in the one or more memories 206 to perform proactive media curation. In some implementations, the one or more sensors 208 collect ambient context data from the environment. For example, the one or more sensors 208 may include location sensors, accelerometers, gyroscopes, microphones, and/or ambient light sensors. In some aspects, the one or more sensors 208 provide ambient context data to software components stored in the memory 206.

In some aspects, the memory 206 stores a plurality of software layers that implement an autonomous agent. In the illustrated example, the memory 206 contains a perception layer 210, a cognition layer 216, and an action layer 226. In some aspects, the layers operate in a pipeline to process ambient context data and generate media playback commands. Although three distinct layers are depicted in FIG. 2, other implementations may include a different number of layers, a different arrangement of layers, or a different distribution of functionality among layers. For example, the perception layer 210 and cognition layer 216 may be combined into a single layer that performs both context acquisition and encoding. In another example, the cognition layer 216 may be divided into separate encoding and search layers. In some implementations, the layers may operate in parallel rather than as a sequential pipeline, or certain functions may be distributed across multiple layers. The illustrated three-layer architecture is one example configuration, and other configurations achieving equivalent functionality are within the scope of the present disclosure. Thus, the mobile device 202 may perform context-aware media curation by organizing processing into distinct functional layers.

In some implementations, the perception layer 210 receives ambient context data from the sensors 208. In some aspects, the perception layer 210 includes an event trigger module 212 and a privacy filter/hysteresis logic module 214. In some aspects, the event trigger module 212 monitors the ambient context data for composite event triggers. A composite event trigger may be a conjunction of at least two conditions, such as a geofence exit combined with an activity transition. In some aspects, the event trigger module 212 applies debounce windows to suppress transient signal fluctuations.

The privacy filter/hysteresis logic module 214 may process raw sensor data into privacy-reduced representations. In some implementations, the privacy filter/hysteresis logic module 214 discards raw audio frames and retains only logarithmic sound pressure levels. Additionally, or alternatively, the privacy filter/hysteresis logic module 214 may bucketize location data into geohash regions rather than retaining precise coordinates. In some aspects, the privacy filter/hysteresis logic module 214 applies hysteresis to threshold-based conditions. For example, the privacy filter/hysteresis logic module 214 may apply a geofence radius hysteresis of at least 25 meters or a velocity hysteresis of at least 1 kilometer per hour. Thus, the mobile device 202 may preserve user privacy and suppress false trigger events by filtering and conditioning sensor data in the perception layer 210.

In some aspects, the cognition layer 216 performs context encoding and similarity search operations. In some implementations, the cognition layer 216 includes an embedding engine 218 and a vector database 220. In some aspects, the embedding engine 218 encodes the ambient context data into a context vector. In some implementations, the embedding engine 218 uses a temporal encoder selected from an autoencoder, a recurrent neural network, or a transformer to produce the context vector as a fixed-length embedding. In some aspects, the embedding engine 218 performs temporal downsampling to a fixed window length between 4 seconds and 8 seconds.

In some aspects, the vector database 220 stores vector representations for similarity search operations. In the illustrated example, the vector database 220 includes a history space 222 and a catalog space 224. In some implementations, the history space 222 stores associations between context vectors and preference vectors. In some aspects, the history space 222 captures learned relationships between past contexts and user-preferred media characteristics. In some implementations, the catalog space 224 stores media vectors representing available media items. In some aspects, each media vector in the catalog space 224 encodes audio features such as tempo, energy, mood, and musical key.

In some aspects, the vector database 220 employs an approximate nearest neighbor index. An approximate nearest neighbor (ANN) index is a data structure that enables fast retrieval of vectors similar to a query vector without exhaustively comparing the query to every stored vector. ANN indices may trade a small amount of retrieval accuracy for improvements in search speed and memory efficiency, making them suitable for resource-constrained mobile devices. For example, the vector database 220 may use hierarchical navigable small world (HNSW) graphs or inverted file product quantization (IVF-PQ).

A hierarchical navigable small world (HNSW) graph organizes vectors into a multi-layer graph structure where each layer contains a subset of the vectors from the layer below. The top layers contain fewer vectors with long-range connections that enable rapid coarse navigation, while the bottom layers contain all vectors with short-range connections for fine-grained search. During a search, the algorithm begins at the top layer and greedily navigates toward the query vector, descending to lower layers as it approaches the target region. This hierarchical structure enables logarithmic search complexity relative to the number of stored vectors. The connectivity parameter M controls how many connections each node maintains, affecting both search accuracy and memory consumption. Higher M values improve recall but increase memory usage. The search parameter $ef_{search}$ controls how many candidate nodes are evaluated during search, with higher values improving accuracy at the cost of increased latency. In some implementations, the history space 222 is indexed using an HNSW graph configured with a connectivity parameter M of at least 8 and a search parameter $ef_{search}$ of at least 64. These parameter values balance retrieval accuracy with the memory and latency constraints of mobile devices.

Inverted file product quantization (IVF-PQ) combines two techniques to reduce memory consumption while maintaining search efficiency. The inverted file (IVF) component partitions the vector space into a number of clusters, each represented by a centroid. During search, only clusters whose centroids are close to the query vector are examined, reducing the number of comparisons required. The product quantization (PQ) component compresses each vector by dividing it into sub-vectors and encoding each sub-vector using a learned codebook. This compression dramatically reduces memory consumption, enabling large catalogs to fit in device memory. The number of lists parameter controls how many clusters partition the vector space, with more lists providing finer granularity but requiring more centroids to examine during search. The codebook bit depth controls compression ratio, with more bits per sub-vector providing higher fidelity at the cost of increased memory. Additionally, or alternatively, the catalog space 224 may be indexed using IVF-PQ with a number of lists of at least 256 and codebooks having at least 8 bits per sub-vector. IVF-PQ is particularly suitable for the catalog space 224 because media catalogs may contain millions of items, and the compression provided by product quantization enables storage of large catalogs within mobile device memory constraints.

In some implementations, the history space 222 and the catalog space 224 use different index types based on their respective characteristics. The history space 222, which stores context-preference associations accumulated over time, may be smaller and benefit from the high recall accuracy of HNSW graphs. The catalog space 224, which stores media vectors representing a potentially large content library, may benefit from the memory efficiency of IVF-PQ compression. In some aspects, other ANN index types may be used, such as locality-sensitive hashing (LSH), random projection trees, or graph-based indices other than HNSW. The specific index types and parameters described herein are illustrative examples, and other configurations achieving efficient approximate nearest neighbor search are within the scope of the present disclosure. Thus, the mobile device 202 may perform efficient similarity searches within memory and latency constraints by using approximate nearest neighbor indices.

In some aspects, the cognition layer 216 performs a two-stage similarity search. In a first stage, the embedding engine 218 may query the history space 222 using the context vector to retrieve one or more preference vectors. In some implementations, the first similarity search employs cosine similarity as a distance metric. In a second stage, the embedding engine 218 may compute a target media profile vector from the preference vectors and query the catalog space 224 to identify one or more media vectors. In some implementations, the second similarity search employs inner product similarity or Euclidean distance as a distance metric. Thus, the mobile device 202 may match current context to learned preferences and then identify suitable media by performing two-stage local similarity search.

In some aspects, the history space 222 and the catalog space 224 are stored in distinct memory pools with independent eviction policies. For example, the history space 222 may employ a least-recently-used eviction policy and the catalog space 224 may employ a popularity-aware eviction policy. Thus, the mobile device 202 may optimize memory usage by applying different retention strategies to different vector spaces.

In some aspects, the action layer 226 enforces policies and executes media playback commands. In some implementations, the action layer 226 includes a policy engine 228 and an API execution module 230. In some aspects, the policy engine 228 evaluates safety and consent policies prior to issuing playback commands. In some implementations, the policy engine 228 gates playback upon verifying that: (i) a user consent flag is enabled, (ii) a current time is outside a quiet hours interval, and (iii) a device-state predicate is satisfied. The device-state predicate may include at least one of: a Bluetooth audio device is connected, the device is charging, or a device display is off. In some aspects, the policy engine 228 causes preview playback or notification instead of automatic playback when a safety mode is active. Thus, the mobile device 202 may respect user preferences and avoid unwanted interruptions by enforcing safety and consent policies.

In some aspects, the API execution module 230 issues playback commands to external services. In some implementations, the API execution module 230 transmits a playback request via the network 232 to an external media service API 234. The playback request may include one of: a start playback command, a resume playback command, a queue creation command, or a playlist generation command. In some aspects, the API execution module 230 issues the playback request without receiving an explicit user interface command. Thus, the mobile device 202 may initiate media playback proactively by issuing commands through the API execution module 230.

In the illustrated example, the network 232 represents a communication path between the mobile device 202 and external services. In some aspects, the network 232 includes wireless communication links such as cellular or Wi-Fi connections. In some implementations, the external media service API 234 receives playback requests and provides media content in response. In some aspects, the external media service API 234 is a cloud-based music streaming service.

A learning feedback path 236 returns outcome signals from the action layer 226 to the cognition layer 216. In some aspects, the learning feedback path 236 carries outcome signals including skip rate and completion rate. In some implementations, the cognition layer 216 updates associations in the history space 222 based on the outcome signals. In some aspects, the associations are updated exclusively on-device without transmitting outcome signals off-device. Thus, the mobile device 202 may improve preference matching over time by learning from user responses to played media.

In some aspects, the autonomous agent operates as a headless background service awakened by an operating system broadcast. In some implementations, the autonomous agent transitions among idle, active, and suspend states according to an energy management policy. In some aspects, the autonomous agent performs the first similarity search and the second similarity search within a budgeted time slice of at most 20 milliseconds. In some implementations, the autonomous agent achieves an end-to-end decision latency of less than 50 milliseconds from detection of a composite event trigger to issuance of a playback request. Thus, the mobile device 202 may conserve battery and respond quickly to context changes by operating within energy and latency budgets.

In some aspects, vectors stored in the vector database 220 are encrypted using a hardware-backed, device-scoped key. In some implementations, the vectors are rotated after a retention period with tombstoning of expired entries. Thus, the mobile device 202 may protect stored preference data by encrypting vectors at rest and enforcing retention policies.

The components of FIG. 2 may correspond to elements depicted in FIG. 1. The mobile device 202 of FIG. 2 may be the same as or similar to the mobile device 130 of FIG. 1. The sensors 208 of FIG. 2 may provide the ambient context data represented by the activity indicator 120, velocity indicator 122, and Bluetooth audio indicator 124 of FIG. 1. The event trigger module 212 of FIG. 2 may detect composite event triggers based on conditions such as the geofence boundary 114, activity indicator 120, velocity indicator 122, and Bluetooth audio indicator 124 of FIG. 1. The privacy filter/hysteresis logic 214 of FIG. 2 may implement the privacy preservation indicated by privacy indicator 134 of FIG. 1. The on-device processing 132 of FIG. 1, which includes context encoding, preference matching, and media selection, may be performed by the cognition layer 216 of FIG. 2, including the embedding engine 218 and vector database 220. The API execution module 230 of FIG. 2 may generate and transmit the playback request 136 of FIG. 1. The external media service API 234 of FIG. 2 may be the same as or similar to the music service API 142 of FIG. 1. The network 232 of FIG. 2 may carry the playback request 136 to the music service API 142 and return the audio stream 146 of FIG. 1. The policy engine 228 of FIG. 2 may enforce policies that enable the no manual input operation indicated by no manual input indicator 144 of FIG. 1. The learning feedback path 236 of FIG. 2 may refine preference associations based on user responses to the automatic playback 118 of FIG. 1. Thus, FIG. 2 provides a detailed architectural view of the system components that implement the operational concept depicted in FIG. 1.

Figure 3:
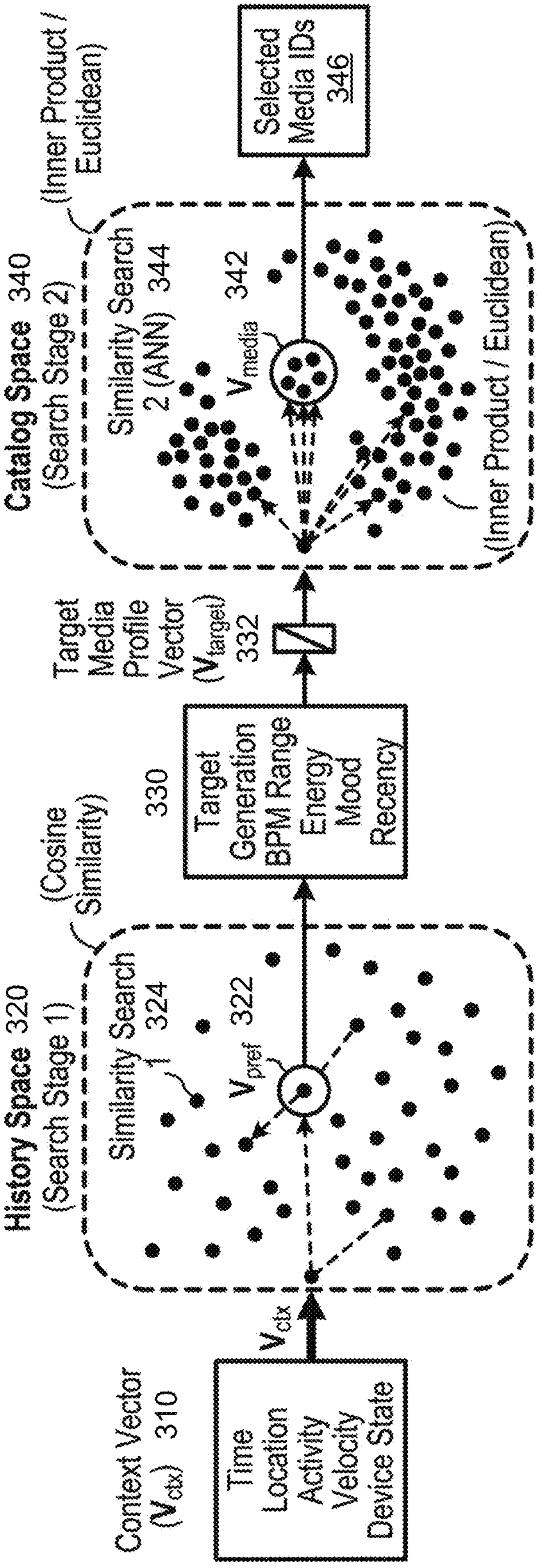
FIG. 3 illustrates vector data structures and a two-stage similarity search pipeline, in accordance with aspects of the present disclosure.

FIG. 3 illustrates a vector data structures and two-stage search diagram 300 according to aspects of the present disclosure. In the illustrated example, the diagram 300 depicts a two-stage similarity search pipeline that transforms ambient context data into selected media identifiers.

In some aspects, a mobile device encodes ambient context data into a context vector 310. The context vector 310 is denoted as $V_{ctx}$ in FIG. 3. A context vector may be a fixed-length numerical representation that captures the user's current situational state. In some implementations, the context vector 310 encodes multiple input features including time, location, activity, velocity, and/or device state. For example, time may include time of day and day of week. Location may include a bucketized geohash region. Activity may include a classified motion state such as running or walking. Velocity may include a scalar speed value in kilometers per hour. Device state may include Bluetooth connection state, charging state, or screen state. Thus, the mobile device may represent heterogeneous context signals in a unified vector format by encoding multiple features into the context vector 310.

In some aspects, the mobile device performs a first similarity search 324 in a history space 320 using the context vector 310. The history space 320 may be the same as or similar to history space 222 of FIG. 2 and represents Search Stage 1 of the two-stage pipeline. In some implementations, the history space 320 stores associations between context vectors and preference vectors. In FIG. 3, the history space 320 is depicted as a bounded region containing scattered dots that represent stored context-preference associations. In some aspects, each dot in the history space 320 corresponds to a prior context in which the user provided positive feedback on media playback.

In some aspects, the first similarity search 324 employs cosine similarity as a distance metric. Cosine similarity may measure the angular distance between two vectors. In some implementations, the mobile device identifies one or more stored contexts that are most similar to the current context vector 310. The first similarity search 324 retrieves one or more preference vectors, denoted as $V_{pref}$ 322. A preference vector may capture learned user preferences associated with a particular context. In FIG. 3, the preference vector $V_{pref}$ 322 is depicted as a highlighted dot within the history space 320. Thus, the mobile device may identify relevant user preferences by searching the history space 320 for contexts similar to the current context.

In some aspects, the mobile device computes a target media profile vector 332 from the one or more preference vectors $V_{pref}$ 322. The target media profile vector 332 is denoted as $V_{target}$ in FIG. 3. In some implementations, a target generation module 330 transforms the preference vectors into the target media profile vector 332. In some aspects, the target generation module 330 applies constraints to shape the target media profile vector 332. As a non-limiting example, the constraints may include at least one of: BPM range, energy, mood, or recency. In some implementations, BPM range specifies a tempo range in beats per minute. Energy may specify an intensity level for the desired media. Mood may specify an emotional characteristic such as upbeat or relaxed. Recency may specify a weighting factor that favors recently released or recently played media. Thus, the mobile device may tailor media selection to specific musical characteristics by applying constraints during target generation.

In some aspects, the target media profile vector 332 is computed as a weighted combination of one or more preference vectors and one or more constraint vectors. In some implementations, the weights satisfy a simplex constraint. In some aspects, the weights are learned or adjusted on-device based on user feedback.

As one example, the target media profile vector may be computed according to the formula: $V_{target}=w_1 \times V_{pref}1+w_2 \times V_{pref}2+w_3 \times V_{constraint\_BPM}$, where $w_1=0.7$, $w_2=0.2$, and $w_3=0.1$, and where the weights sum to 1.0. For example, when a user begins a running activity, the mobile device may retrieve two preference vectors from previous running contexts ($V_{pref1}$ representing a high-energy rock preference with weight 0.7, and $V_{pref2}$ representing an upbeat electronic preference with weight 0.2), and combine these with a constraint vector specifying a tempo range of 140-160 BPM with weight 0.1. The weights may be determined based on recency and confidence scores associated with the retrieved preference vectors, such that more recent or frequently-reinforced preferences receive higher weights. In some implementations, the weights are normalized to ensure they sum to 1.0.

In some aspects, the mobile device performs a second similarity search 344 in a catalog space 340 using the target media profile vector 332. The catalog space 340 may be the same as or similar to the catalog space 224 of FIG. 2 and represents Search Stage 2 of the two-stage pipeline. In some implementations, the catalog space 340 stores media vectors representing available media items. In FIG. 3, the catalog space 340 is depicted as a bounded region containing scattered dots that represent stored media vectors. In some aspects, the catalog space 340 contains more vectors than the history space 320 because the catalog represents a larger media library.

In some aspects, the second similarity search 344 employs approximate nearest neighbor (ANN) search. ANN search may identify vectors that are approximately closest to a query vector without exhaustively comparing all vectors. In some implementations, the second similarity search 344 employs inner product similarity or Euclidean distance as a distance metric. Inner product similarity may measure the dot product between two vectors. Euclidean distance may measure the straight-line distance between two vectors in the vector space. Thus, the mobile device may efficiently search large media catalogs by using approximate nearest neighbor techniques.

In some aspects, the first similarity search 324 employs a first distance metric and the second similarity search 344 employs a second distance metric different from the first distance metric. For example, the first distance metric may comprise cosine similarity and the second distance metric may comprise inner product similarity or Euclidean distance. Thus, the mobile device may optimize each search stage independently by selecting distance metrics appropriate for each vector space.

In some implementations, the second similarity search 344 identifies one or more media vectors, denoted as $V_{media}$ 342. In FIG. 3, the media vectors $V_{media}$ 342 are depicted as highlighted dots within the catalog space 340, with dashed lines indicating similarity relationships to the target media profile vector 332. In some aspects, the second similarity search 344 identifies K candidate media vectors closest to the target media profile vector 332.

In some aspects, the mobile device filters the candidate media vectors by availability and locale constraints before generating output. In some implementations, the mobile device applies explicit content filtering based on user preferences. In some aspects, the second similarity search 344 produces selected media IDs 346. In some implementations, the selected media IDs 346 identify specific media items that match the target media profile. In some aspects, the selected media IDs 346 are passed to an API execution module that issues a playback request to an external media service.

In some aspects, the device-resident vector database employs an approximate nearest neighbor index for efficient search. For example, the vector database may use HNSW graphs or IVF-PQ. In some implementations, the history space 320 is indexed using an HNSW graph configured with a connectivity parameter M of at least 8 and a search parameter $ef_{search}$ of at least 64. Additionally, or alternatively, the catalog space 340 may be indexed using IVF-PQ with a number of lists of at least 256 and codebooks having at least 8 bits per sub-vector. Thus, the mobile device may perform memory-efficient similarity searches by using compressed index structures.

In some aspects, the history space 320 and the catalog space 340 are stored in distinct memory pools with independent eviction policies. For example, the history space 320 may employ a least-recently-used eviction policy and the catalog space 340 may employ a popularity-aware eviction policy. Thus, the mobile device may optimize memory usage by applying different retention strategies to the two vector spaces.

In the illustrated example, a flow summary may include the following complete pipeline: $V_{ctx}$→Search 1→$V_{pref}$→Target Generation→$V_{target}$→Search 2→$V_{media}$. In some implementations, the mobile device executes this pipeline within a budgeted time slice of at most 20 milliseconds. In some aspects, the mobile device achieves an end-to-end decision latency of less than 50 milliseconds from detection of a composite event trigger to issuance of a playback request. Thus, the mobile device may provide responsive media curation by executing the two-stage search pipeline within strict latency constraints.

Figure 4:
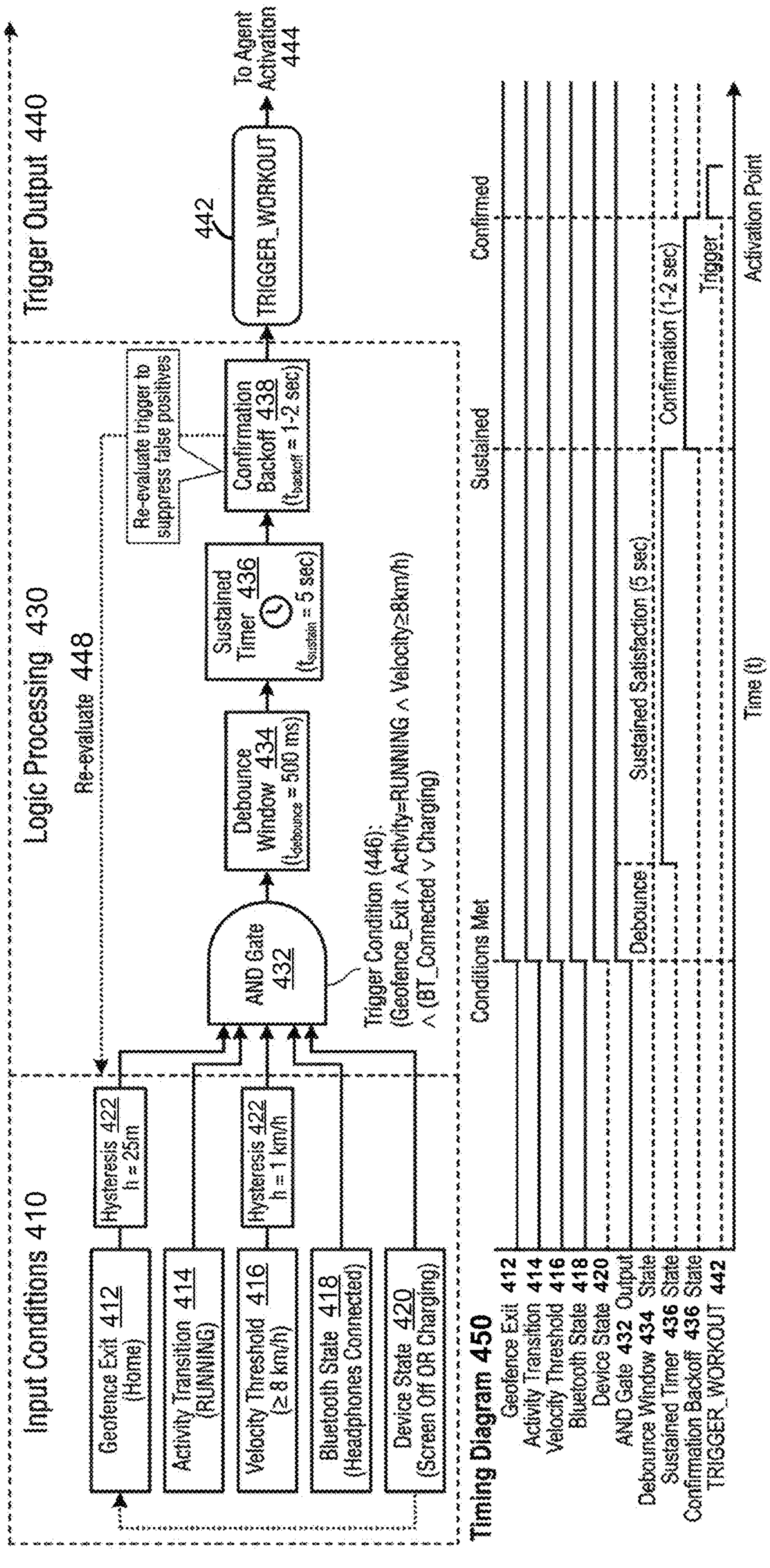
FIG. 4 illustrates composite trigger detection logic with hysteresis and timing validation, in accordance with aspects of the present disclosure.

FIG. 4 illustrates a composite trigger detection logic diagram 400 according to aspects of the present disclosure. In the illustrated example, the diagram 400 depicts how a mobile device detects a composite event trigger based on ambient context data and applies timing validation before initiating agent activation.

In the illustrated example, the diagram 400 is organized into three functional sections: input conditions 410, logic processing 430, and trigger output 440. In some aspects, input conditions 410 represent individual sensor readings and device states. In some implementations, logic processing 430 applies Boolean logic and temporal validation. In some aspects, trigger output 440 produces a validated trigger signal for agent activation.

In some aspects, the mobile device detects a composite event trigger comprising a conjunction of at least two conditions. The input conditions 410 include a geofence exit condition 412, an activity transition condition 414, a velocity threshold condition 416, a Bluetooth state condition 418, and a device state condition 420. In some implementations, the composite event trigger comprises a conjunction of at least three conditions selected from these inputs.

In some implementations, the geofence exit condition 412 detects when the user exits a defined geographic region. In the illustrated example, the geofence exit condition 412 is associated with a "Home" location. In some aspects, the geofence exit condition 412 applies a hysteresis 422 with a value h=25 meters. Hysteresis may prevent oscillation when the user is near the geofence boundary. Thus, the mobile device may suppress false trigger events caused by GPS drift by applying hysteresis to the geofence exit condition 412.

In some implementations, the activity transition condition 414 detects when the user transitions to a specified activity state. In the illustrated example, the activity transition condition 414 detects a transition to "RUNNING." In some aspects, activity transitions may include transitions from stationary to walking, walking to running, or stationary to cycling.

In some implementations, the velocity threshold condition 416 detects when the user's velocity exceeds a specified threshold. In the illustrated example, the velocity threshold condition 416 specifies a threshold of at least 8 km/h. In some aspects, the velocity threshold condition 416 applies a hysteresis 422 with a value h=1 km/h. Thus, the mobile device may suppress spurious trigger events by requiring the velocity to exceed the threshold by a margin before activating.

In some implementations, the Bluetooth state condition 418 detects the connection state of a Bluetooth audio device. In the illustrated example, the Bluetooth state condition 418 detects "Headphones Connected." In some aspects, the Bluetooth state condition 418 serves as a device-state predicate that may be satisfied before issuing a playback request.

In some implementations, the device state condition 420 detects one or more device states. In the illustrated example, the device state condition 420 detects "Screen Off OR Charging." In some aspects, the device state condition 420 is satisfied when either the device display is off or the device is charging.

In some aspects, the logic processing 430 combines the input conditions 410 using Boolean logic and applies temporal validation. In some implementations, an AND gate 432 receives signals from the input conditions 410. In some aspects, the AND gate 432 outputs a high signal when all specified input conditions are satisfied simultaneously. In the illustrated example, a trigger condition 446 specifies the Boolean expression: $(\text{Geofence\_Exit} \wedge \text{Activity}=\text{RUNNING} \wedge \text{Velocity} \geq 8\ \text{km/h}) \wedge (\text{BT\_Connected} \vee \text{Charging})$. Thus, the mobile device may detect complex contextual situations by combining multiple heterogeneous conditions using Boolean conjunction.

In some aspects, detection of the composite event trigger employs hysteresis and debounce windows to suppress false positives. In some implementations, a debounce window 434 receives the output of the AND gate 432. In the illustrated example, the debounce window 434 has a duration $t_{debounce}$=500 ms. The debounce window 434 may filter transient signal fluctuations that briefly satisfy the trigger conditions. Thus, the mobile device may suppress noise-induced false triggers by applying a debounce window 434.

In some aspects, detection of the composite event trigger involves sustained satisfaction of trigger conditions for a time window. In some implementations, a sustained timer 436 receives the output of the debounce window 434. In the illustrated example, the sustained timer 436 has a duration $t_{sustain}$=5 sec. In some aspects, the time window is between 3 seconds and 10 seconds. Of course, the timer window may be less than, greater than, and/or different than that which is stated herein. In some implementations, the sustained timer 436 verifies that the trigger conditions remain satisfied for the specified duration. Thus, the mobile device may distinguish intentional activity from momentary movements by verifying sustained satisfaction of trigger conditions.

In some aspects, issuing a playback request is preceded by a confirmation backoff interval during which the composite event trigger is reevaluated. In some implementations, a confirmation backoff module 438 receives the output of the sustained timer 436. In the illustrated example, the confirmation backoff module 438 has a duration $t_{backoff}$=1-2 sec. In some aspects, the confirmation backoff interval is between 1 second and 2 seconds. In some aspects, the confirmation backoff interval may be less than 1 second or greater than 2 seconds depending on application requirements, sensor characteristics, or user preferences. In some implementations, the confirmation backoff module 438 reevaluates the trigger conditions to suppress false positives. In some aspects, a re-evaluate path 448 returns from the confirmation backoff module 438 to the input conditions 410 for reevaluation. Thus, the mobile device may suppress false positives by confirming that trigger conditions remain satisfied before issuing a playback request.

In some aspects, the trigger output 440 produces a validated trigger signal. In some implementations, a TRIGGER_WORKOUT signal 442 is generated when all temporal validation stages complete successfully. In some aspects, the TRIGGER_WORKOUT signal 442 initiates agent activation 444. In some implementations, agent activation 444 causes the mobile device to proceed with context encoding, similarity search, and playback request issuance.

In the illustrated example, a timing diagram 450 depicts the temporal relationships among the input conditions and processing stages. In some aspects, the timing diagram 450 shows signal traces for the geofence exit 412, activity transition 414, velocity threshold 416, Bluetooth state 418, device state 420, AND gate 432 output, debounce window 434 state, sustained timer 436 state, confirmation backoff 438 state, and TRIGGER_WORKOUT 442. A time axis labeled Time (t) spans the bottom of the timing diagram 450.

In the illustrated example, the timing diagram 450 illustrates three temporal phases. A first phase labeled "Conditions Met" indicates when all input conditions 410 transition to a satisfied state. A second phase labeled "Sustained" indicates the sustained satisfaction period of 5 seconds. A third phase labeled "Confirmed" indicates the confirmation backoff period of 1-2 seconds. An activation point at the end of the timing diagram 450 indicates when the TRIGGER_WORKOUT signal 442 transitions to an active state.

In some aspects, the timing diagram 450 shows that the debounce window 434 state transitions high after a brief delay following the "Conditions Met" point. In some implementations, the sustained timer 436 state transitions high after the sustained satisfaction period completes. In some aspects, the confirmation backoff 438 state indicates the final reevaluation period. In some implementations, the TRIGGER_WORKOUT 442 transitions high at the activation point after all temporal validation completes.

In some aspects, the mobile device achieves an end-to-end decision latency of less than 50 milliseconds from detection of the composite event trigger to issuance of a playback request. In some implementations, the temporal validation stages (debounce, sustained satisfaction, confirmation backoff) complete before the latency measurement begins. Thus, the mobile device may provide reliable trigger detection while maintaining responsive media curation by separating trigger validation from playback execution.

Figure 5:
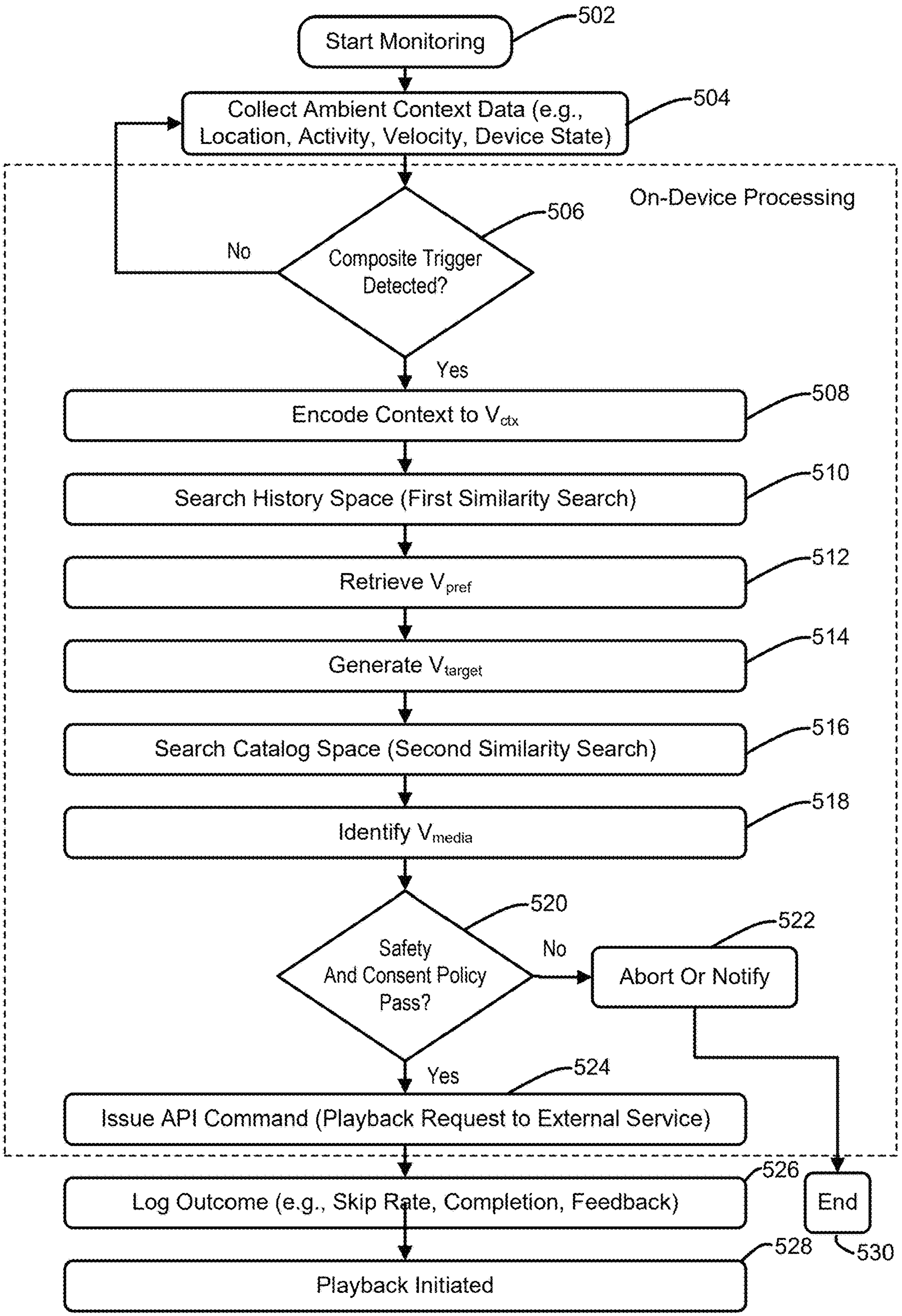
FIG. 5 illustrates an operational flowchart for proactive media curation, in accordance with aspects of the present disclosure.

FIG. 5 illustrates an operational flowchart 500 according to aspects of the present disclosure. In the illustrated example, the flowchart 500 depicts the end-to-end process for proactive media curation, from context monitoring through playback initiation.

In some aspects, a mobile device begins the proactive media curation process at a start monitoring step 502. In some implementations, the start monitoring step 502 initiates continuous observation of ambient context data. In some aspects, the mobile device performs the start monitoring step 502 when the user enables proactive playback or when the device boots.

In some aspects, the mobile device collects ambient context data at step 504. The ambient context data may include location, activity, velocity, and device state. For example, location may include GPS coordinates or a bucketized geohash region. Activity may include a classified motion state such as running, walking, or stationary. Velocity may include a scalar speed value in kilometers per hour. Device state may include Bluetooth connection state, charging state, or screen state. Thus, the mobile device may gather heterogeneous sensor readings by collecting ambient context data at step 504.

In some aspects, the mobile device evaluates whether a composite trigger is detected at decision step 506. A composite event trigger may be a conjunction of at least two conditions that are satisfied simultaneously. In some implementations, the composite event trigger comprises a geofence exit, an activity transition, and/or a velocity exceeding a threshold. In some aspects, the composite trigger comprises different conditions that are satisfied. If no composite trigger is detected, the flowchart 500 returns along a "No" path to step 504 to continue monitoring. If a composite trigger is detected, the flowchart 500 proceeds along a "Yes" path to step 508. Thus, the mobile device may operate efficiently by continuing to monitor until a meaningful context change occurs.

In the illustrated example, a dashed boundary labeled "On-Device Processing" encompasses steps 508 through 518. In some aspects, all processing within this boundary occurs exclusively on the mobile device. In some implementations, raw context data is not transmitted off-device during on-device processing. Thus, the mobile device may preserve user privacy by performing context encoding and similarity search operations locally.

In some aspects, the mobile device encodes the ambient context data into a context vector at step 508. The context vector is denoted as $V_{ctx}$. In some implementations, encoding comprises summarizing time-series sensor data using a temporal encoder selected from an autoencoder, a recurrent neural network, or a transformer. In some aspects, the context vector is a fixed-length embedding that represents the user's current situational state.

In some aspects, the mobile device searches a history space at step 510. Step 510 represents a first similarity search. In some implementations, the history space stores associations between context vectors and preference vectors. In some aspects, the first similarity search employs cosine similarity as a distance metric. Thus, the mobile device may identify relevant past contexts by searching the history space at step 510.

In some aspects, the mobile device retrieves one or more preference vectors at step 512. The preference vectors are denoted as $V_{pref}$. In some implementations, a preference vector captures learned user preferences associated with a particular context. In some aspects, the preference vectors represent media characteristics that the user enjoyed in similar past contexts.

In some aspects, the mobile device generates a target media profile vector at step 514. The target media profile vector is denoted as $V_{target}$. In some implementations, the mobile device computes the target media profile vector from the one or more preference vectors. In some aspects, the target media profile vector encodes constraints comprising at least one of: tempo range, musical key, energy score, mood label, recency weighting, or explicit content filtering. Thus, the mobile device may tailor media selection to specific characteristics by generating the target media profile vector at step 514.

In some aspects, the mobile device searches a catalog space at step 516. Step 516 represents a second similarity search. In some implementations, the catalog space stores media vectors representing available media items. In some aspects, the second similarity search employs ANN techniques. In some implementations, the second similarity search employs inner product similarity or Euclidean distance as a distance metric. Thus, the mobile device may efficiently identify matching media by searching the catalog space at step 516.

In some aspects, the mobile device identifies one or more media vectors at step 518. The media vectors are denoted as $V_{media}$. In some implementations, the mobile device identifies K candidate media vectors closest to the target media profile vector. In some aspects, the mobile device filters the candidate media vectors by availability and locale constraints.

In some aspects, the mobile device evaluates whether a safety and consent policy passes at decision step 520. In some implementations, the safety and consent policy gates playback upon verifying that: (i) a user consent flag is enabled, (ii) a current time is outside a quiet hours interval, and (iii) a device-state predicate is satisfied. If the safety and consent policy does not pass, the flowchart 500 proceeds along a "No" path to an abort or notify step 522. If the safety and consent policy passes, the flowchart 500 proceeds along a "Yes" path to step 524. Thus, the mobile device may respect user preferences and avoid unwanted interruptions by enforcing safety and consent policies at step 520.

In some aspects, the mobile device performs an abort or notify action at step 522 when the safety and consent policy does not pass. In some implementations, the abort or notify step 522 causes the mobile device to display a notification instead of initiating automatic playback. Additionally, or alternatively, the abort or notify step 522 may cause the mobile device to suspend playback until conditions change. After step 522, the flowchart 500 proceeds to an end step 530.

In some aspects, the mobile device issues an API command at step 524. In some implementations, the API command comprises a playback request to an external service. In some aspects, the playback request comprises one of: a start playback command, a resume playback command, a queue creation command, or a playlist generation command. In some implementations, the mobile device issues the playback request without receiving an explicit user interface command. Thus, the mobile device may initiate media playback proactively by issuing the API command at step 524.

In some aspects, the mobile device logs outcome signals at step 526. The outcome signals may include skip rate, completion rate, and/or user feedback. In some implementations, the mobile device updates associations in the history space based on the outcome signals. In some aspects, the associations are updated exclusively on-device without transmitting outcome signals off-device. Thus, the mobile device may improve preference matching over time by logging outcome signals at step 526.

In some aspects, the flowchart 500 reaches a playback initiated step 528 after logging outcome signals. In some implementations, the playback initiated step 528 indicates successful completion of the proactive media curation process. In some aspects, the mobile device returns to the start monitoring step 502 after playback is initiated to detect subsequent context changes.

In some aspects, the flowchart 500 terminates at an end step 530. In some implementations, the end step 530 is reached via the abort or notify path when the safety and consent policy does not pass.

In some aspects, the mobile device achieves an end-to-end decision latency of less than 50 milliseconds from detection of the composite event trigger at step 506 to issuance of the playback request at step 524. In some implementations, the mobile device executes steps 508 through 518 within a budgeted time slice of at most 20 milliseconds. Thus, the mobile device may provide responsive media curation by executing the operational flowchart 500 within strict latency constraints.

Figure 6:
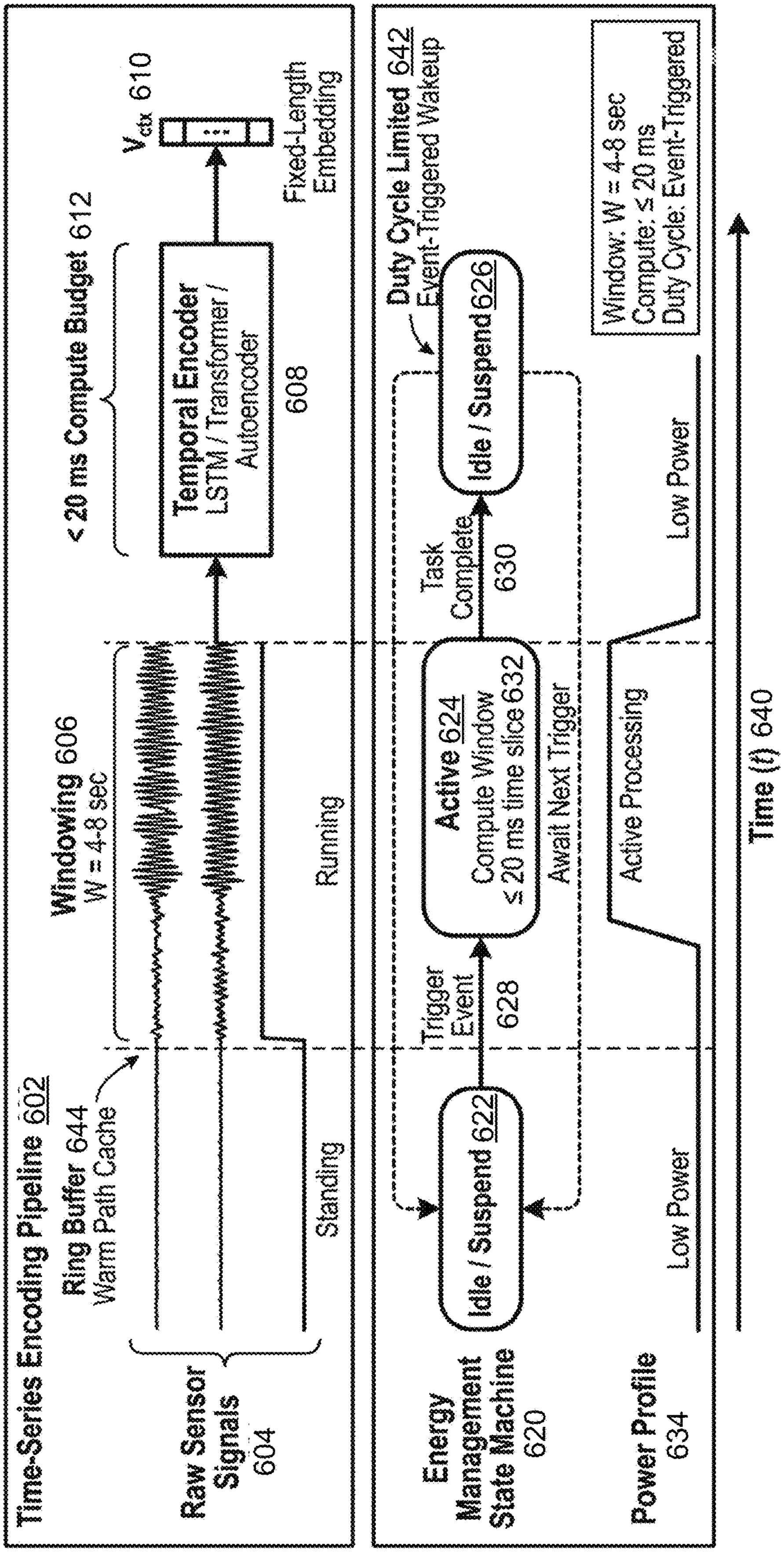
FIG. 6 illustrates time-series encoding and energy management, in accordance with aspects of the present disclosure.

FIG. 6 illustrates a time-series encoding and energy management diagram 600 according to aspects of the present disclosure. In the illustrated example, the diagram 600 depicts how a mobile device encodes ambient context data into a context vector while operating within energy and latency constraints.

In the illustrated example, the diagram 600 is organized into two functional sections: a time-series encoding pipeline 602 in an upper portion and an energy management state machine 620 in a lower portion. In some aspects, the two sections operate in coordination to balance computational performance with battery conservation.

In some aspects, the mobile device receives raw sensor signals 604 from one or more sensors. In some implementations, the raw sensor signals 604 represent continuous time-series data from ambient context sources. In the illustrated example, the raw sensor signals 604 depict waveforms corresponding to different activity states. In some aspects, a first portion of the waveform labeled "Standing" shows relatively low-amplitude signals. In some aspects, a second portion of the waveform labeled "Running" shows higher-amplitude oscillating signals. Thus, the mobile device may capture activity-related patterns by monitoring raw sensor signals 604 over time.

In some aspects, the mobile device stores the raw sensor signals 604 in a ring buffer 644. The ring buffer 644 serves as a warm path cache. In some implementations, a ring buffer is a fixed-size data structure that overwrites oldest data when full. A warm path cache maintains pre-collected data in a ready state so that processing can begin immediately when needed, rather than waiting to collect fresh data. In contrast, a cold start occurs when no cached data is available and the system must wait to accumulate sufficient sensor history before processing can proceed. By continuously storing recent sensor readings in the ring buffer 644, the mobile device maintains a warm path that enables immediate context encoding upon trigger detection. For example, when a composite event trigger is detected, the temporal encoder 608 can immediately access the preceding 4-8 seconds of sensor data from the ring buffer 644 rather than waiting to collect new data. In some aspects, the ring buffer 644 maintains recent sensor history to enable rapid context encoding when a trigger event occurs. In some implementations, the ring buffer 644 stores sensor data spanning a duration at least equal to the windowing length W used by the temporal encoder 608, ensuring sufficient history is always available. Thus, the mobile device may reduce cold start latency by caching recent sensor data in the ring buffer 644, enabling sub-50 millisecond response times from trigger detection to playback request issuance.

In some aspects, the mobile device performs windowing 606 on the raw sensor signals 604. In some implementations, windowing 606 extracts a fixed-length segment of sensor data for encoding. In the illustrated example, the windowing 606 uses a window length W=4-8 seconds, though other time frames are contemplated. In some aspects, windowing 606 includes temporal downsampling to a fixed window length between 4 seconds and 8 seconds. Thus, the mobile device may normalize variable-length sensor streams into consistent input segments by performing windowing 606.

In some aspects, the mobile device processes the windowed data using a temporal encoder 608. In some implementations, the temporal encoder 608 transforms the windowed sensor data into a fixed-length embedding. In some aspects, the temporal encoder 608 comprises an LSTM (Long Short-Term Memory network), a transformer, or an autoencoder. In some implementations, encoding comprises summarizing time-series sensor data using a temporal encoder selected from an autoencoder, a recurrent neural network, or a transformer. Thus, the mobile device may extract meaningful features from time-series data by using the temporal encoder 608.

As one non-limiting example, the temporal encoder 608 comprises a 2-layer bidirectional LSTM with 128 hidden units per direction, processing 8-second windows of sensor data sampled at 10 Hz (yielding 80 time steps per window). The windowed sensor data may include accelerometer readings (3 channels), gyroscope readings (3 channels), GPS velocity (1 channel), and ambient sound pressure level (1 channel), for a total of 8 input features per time step. The LSTM may process this multi-channel input sequence and output a 256-dimensional context vector ($V_{ctx}$) by concatenating the final hidden states from both forward and backward directions. In some implementations, the model employs quantized int8 inference to reduce computation, achieving sub-10 millisecond latency on mobile neural processing units (NPUs). Accordingly, the mobile device may meet the compute budget 612 constraint of less than 20 milliseconds for temporal encoding while producing contextual representations suitable for similarity search. Those skilled in the art will recognize that other temporal encoder architectures may be employed, including but not limited to transformers with different attention mechanisms, autoencoders with varying layer configurations, unidirectional LSTMs, GRU (Gated Recurrent Unit) networks, temporal convolutional networks, or statistical feature extraction methods, each of which may be optimized for different mobile hardware constraints, latency requirements, or accuracy targets while remaining within the scope of the present disclosure.

In some aspects, the temporal encoder 608 operates within a compute budget 612. In the illustrated example, the compute budget 612 specifies less than 20 milliseconds, though other compute budges are contemplated. In some implementations, the mobile device executes the temporal encoder 608 within a budgeted time slice of at most 20 milliseconds. In some aspects, the compute budget 612 constrains processing time to preserve battery and ensure responsive operation. Thus, the mobile device may balance encoding quality with energy efficiency by operating within the compute budget 612.

In some aspects, the temporal encoder 608 produces a context vector 610. The context vector 610 is denoted as $V_{ctx}$. In the illustrated example, the context vector 610 is labeled as a fixed-length embedding. In some implementations, the context vector 610 is a fixed-length embedding that represents the user's current situational state. In some aspects, the context vector 610 serves as input to similarity search operations in subsequent processing stages. Thus, the mobile device may represent complex temporal patterns in a compact vector format by generating the context vector 610.

In some aspects, the mobile device transitions among states according to an energy management state machine 620. In some implementations, the energy management state machine 620 coordinates processing activity with power consumption. In the illustrated example, the energy management state machine 620 includes three states: a first idle/suspend state 622, an active state 624, and a second idle/suspend state 626.

In some implementations, the mobile device begins in the first idle/suspend state 622. In some aspects, the idle/suspend state 622 represents a low-power mode in which the mobile device awaits a trigger event. In some implementations, the mobile device operates in an event-triggered wakeup mode rather than a polling mode. Thus, the mobile device may conserve battery by remaining in the idle/suspend state 622 until a trigger event occurs.

In some aspects, the mobile device transitions from the first idle/suspend state 622 to the active state 624 upon detecting a trigger event 628. In some implementations, the trigger event 628 corresponds to detection of a composite event trigger based on ambient context data. In some aspects, the trigger event 628 causes the mobile device to wake from the idle/suspend state 622 and begin processing.

In some aspects, the mobile device performs context encoding and similarity search operations in the active state 624. The active state 624 includes a compute window with a time slice 632 of at most 20 milliseconds. In some implementations, the mobile device executes the first similarity search and the second similarity search within the budgeted time slice 632. Thus, the mobile device may complete processing quickly by constraining operations to the time slice 632 in the active state 624.

In some aspects, the mobile device transitions from the active state 624 to the second idle/suspend state 626 upon task completion 630. In some implementations, the task completion 630 indicates that context encoding, similarity search, and playback request issuance have finished. In some aspects, the mobile device returns to a low-power mode after completing the proactive media curation task.

In some aspects, the energy management state machine 620 includes an "Await Next Trigger" path from the second idle/suspend state 626 back toward the first idle/suspend state 622. In some implementations, the mobile device continuously cycles through the state machine as trigger events occur. Thus, the mobile device may handle multiple trigger events over time by cycling through the energy management state machine 620.

In some aspects, the energy management state machine 620 operates with a duty cycle limited configuration 642. The duty cycle limited configuration 642 specifies event-triggered wakeup behavior. In some implementations, the mobile device wakes only in response to detected trigger events rather than periodically polling sensors. Thus, the mobile device may minimize unnecessary processing by using event-triggered wakeup in the duty cycle limited configuration 642.

In some aspects, a power profile 634 depicts the power consumption pattern over time. In the illustrated example, the power profile 634 shows three phases aligned with the state machine transitions. In some aspects, a first "Low Power" phase corresponds to the first idle/suspend state 622. In some aspects, an "Active Processing" phase corresponds to the active state 624. In some aspects, a second "Low Power" phase corresponds to the second idle/suspend state 626. Thus, the mobile device may achieve significant battery savings by spending most time in low-power phases.

In the illustrated example, a time axis 640 labeled "Time (t)" spans the bottom of the diagram 600. In some aspects, the time axis 640 illustrates the temporal alignment between the encoding pipeline 602 and the energy management state machine 620. In some implementations, the windowing 606 in the encoding pipeline 602 occurs during the active processing phase shown in the power profile 634.

In the illustrated example, a parameters box summarizes key operational constraints: Window W=4-8 sec, Compute≤20 ms, and Duty Cycle: Event-Triggered. In some implementations, these parameters may be configured based on device capabilities and user preferences. Thus, the mobile device may adapt its behavior to different operating conditions by adjusting the parameters.

In some aspects, the mobile device achieves an end-to-end decision latency of less than 50 milliseconds from detection of a composite event trigger to issuance of a playback request. In some implementations, the coordination between the time-series encoding pipeline 602 and the energy management state machine 620 enables both responsive operation and efficient power consumption. Thus, the mobile device may provide proactive media curation while preserving battery life by integrating encoding and energy management as shown in diagram 600.

Figure 7:
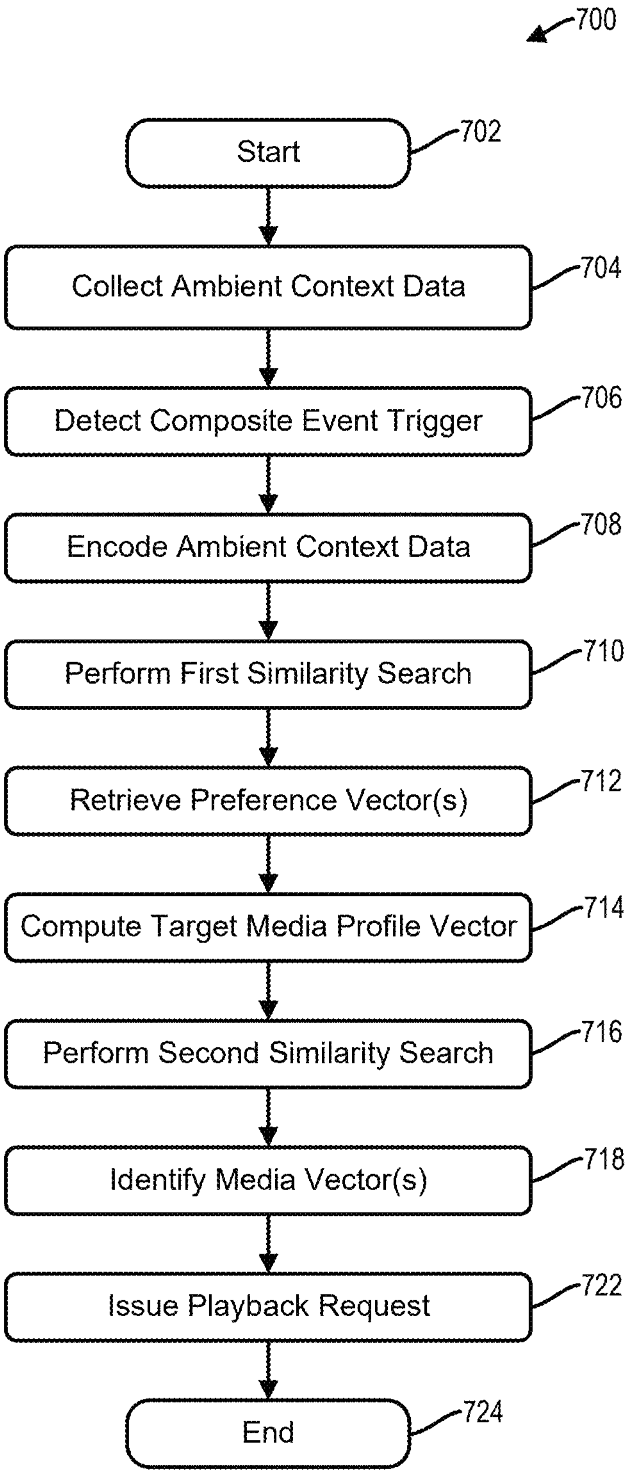
FIG. 7 illustrates a method flow diagram for proactive media curation, in accordance with aspects of the present disclosure.

FIG. 7 depicts an example method 700 for proactive media curation. In one aspect, method 700 can be implemented by the mobile device 202 of FIG. 2 and/or the system architecture described with respect to FIG. 1.

Method 700 starts at block 702. In some aspects, block 702 represents initialization of an autonomous agent operating as a headless background service on a mobile device. In some implementations, the autonomous agent is awakened by an operating system broadcast, as described with respect to the energy management state machine 620 of FIG. 6.

Method 700 continues to block 704 with collecting ambient context data. In some aspects, the mobile device collects ambient context data via at least one sensor. As described with respect to FIG. 1, the ambient context data may include location information (e.g., geofence boundary 114), activity state (e.g., activity indicator 120), velocity (e.g., velocity indicator 122), and device state (e.g., Bluetooth audio indicator 124). In some implementations, the mobile device stores the ambient context data in a ring buffer 644, as described with respect to FIG. 6, to enable rapid context encoding when a trigger event occurs.

Method 700 continues to block 706 with detecting a composite event trigger based on the ambient context data. In some aspects, the composite event trigger comprises a conjunction of at least two conditions selected from: geofence entry or exit, activity transition, velocity threshold, ambient light band, ambient sound pressure band, Bluetooth connection state, and charging state. As described with respect to FIG. 4, the event trigger module 212 applies hysteresis 422 and debounce windows 434 to suppress false positives. In some implementations, detection of the composite event trigger involves sustained satisfaction of trigger conditions for a time window between 3 seconds and 10 seconds, as shown by sustained timer 436 in FIG. 4.

Method 700 continues to block 708 with encoding the ambient context data into a context vector. In some aspects, the context vector is denoted as $V_{ctx}$. As described with respect to FIG. 6, the temporal encoder 608 transforms windowed sensor data into a fixed-length embedding. In some implementations, encoding comprises summarizing time-series sensor data using a temporal encoder selected from an autoencoder, a recurrent neural network, or a transformer. In some aspects, encoding includes temporal downsampling to a fixed window length between 4 seconds and 8 seconds, as shown by windowing 606 in FIG. 6.

Method 700 continues to block 710 with performing a first similarity search. In some aspects, the first similarity search is performed in a history space 320 of a device-resident vector database, as described with respect to FIG. 3. In some implementations, the history space 320 stores associations between context vectors and preference vectors. In some aspects, the first similarity search employs cosine similarity as a distance metric. As described with respect to FIG. 2, the embedding engine 218 queries the history space 222 using the context vector to identify similar past contexts.

Method 700 continues to block 712 with retrieving one or more preference vectors. In some aspects, the preference vectors are denoted as $V_{pref}$ 322, as shown in FIG. 3. In some implementations, a preference vector captures learned user preferences associated with a particular context. In some aspects, the preference vectors represent media characteristics that the user enjoyed in similar past contexts, as learned through the learning feedback path 236 described with respect to FIG. 2.

Method 700 continues to block 714 with computing a target media profile vector. In some aspects, the target media profile vector is denoted as $V_{target}$ 332, as shown in FIG. 3. As described with respect to FIG. 3, the target generation module 330 transforms the preference vectors into the target media profile vector by applying constraints. In some implementations, the target media profile vector encodes constraints comprising at least one of: tempo range, musical key, energy score, mood label, recency weighting, or explicit content filtering. In some aspects, the target media profile vector is computed as a weighted combination of one or more preference vectors and one or more constraint vectors.

Method 700 continues to block 716 with performing a second similarity search. In some aspects, the second similarity search is performed in a catalog space 340 of the device-resident vector database, as described with respect to FIG. 3. In some implementations, the catalog space 340 stores media vectors representing available media items. In some aspects, the second similarity search employs ANN techniques using HNSW graphs or IVF-PQ, as described with respect to FIG. 2. In some implementations, the second similarity search employs inner product similarity or Euclidean distance as a distance metric.

Method 700 continues to block 718 with identifying one or more media vectors. In some aspects, the media vectors are denoted as $V_{media}$ 342, as shown in FIG. 3. In some implementations, the second similarity search identifies K candidate media vectors closest to the target media profile vector. In some aspects, the mobile device filters the candidate media vectors by availability and locale constraints before proceeding to issue a playback request.

Method 700 continues to block 722 with issuing a playback request to an external media service. In some aspects, the playback request is issued without receiving an explicit user interface command, as emphasized by the no manual input indicator 144 in FIG. 1. As described with respect to FIG. 2, the API execution module 230 transmits the playback request via the network 232 to the external media service API 234. In some implementations, the playback request comprises one of: a start playback command, a resume playback command, a queue creation command, or a playlist generation command. In some aspects, the mobile device enforces a safety and consent policy prior to issuing the playback request, as described with respect to the policy engine 228 in FIG. 2.

Method 700 ends at block 724. In some aspects, the mobile device logs outcome signals including skip rate and completion rate after playback begins. As described with respect to FIG. 2, the learning feedback path 236 returns outcome signals to update associations in the history space 222, enabling the mobile device to improve preference matching over time.

Method 700 provides several beneficial technical effects that address the technical problems identified in the background. First, method 700 enables proactive media playback without explicit user interaction, solving the usability problem when manual interaction is infeasible during activities such as running or driving, as illustrated in FIG. 1. Second, method 700 performs all context encoding and similarity search operations on-device using the device-resident vector database, as shown in FIGS. 2 and 3, thereby preserving user privacy by avoiding transmission of sensitive raw context data. Third, method 700 reduces network usage and power consumption compared to cloud-centric approaches by performing local vector search rather than streaming context data to remote servers. In some implementations, method 700 achieves an end-to-end decision latency of less than 50 milliseconds from detection of the composite event trigger at block 706 to issuance of the playback request at block 722, as enabled by the energy-efficient scheduling described with respect to FIG. 6. Fourth, the two-stage similarity search of blocks 710-712 and blocks 716-718 enables context-aware media selection by first matching current context to learned preferences and then identifying media that satisfies the resulting target profile, as illustrated in FIG. 3. Thus, method 700 provides a technical solution that balances responsive, personalized media curation with privacy preservation and energy efficiency.

Note that FIG. 7 is just one example of a method, and other methods including fewer, additional, or alternative operations are possible consistent with this disclosure.

Figure 8:
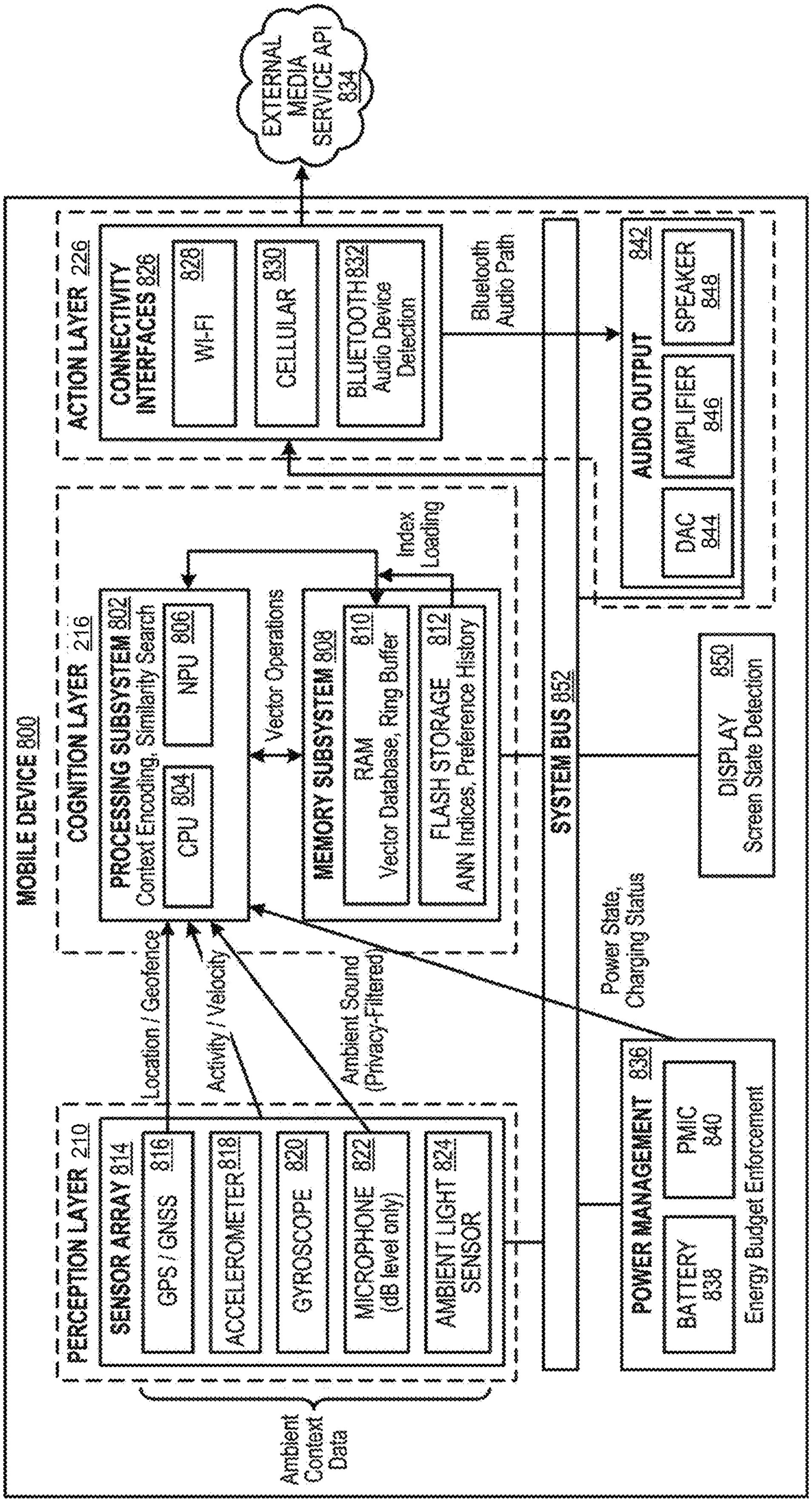
FIG. 8 illustrates a mobile device hardware architecture with software-to-hardware mapping, in accordance with aspects of the present disclosure.

FIG. 8 illustrates a mobile device hardware architecture diagram according to aspects of the present disclosure. In the illustrated example, the diagram depicts the physical components of a mobile device configured to perform proactive media curation, with dashed overlay regions indicating how software layers map to hardware resources.

In some aspects, a mobile device 800 includes a processing subsystem 802, a memory subsystem 808, a sensor array 814, connectivity interfaces 826, power management 836, a display 850, and audio output 842. In some implementations, the components communicate via a system bus 852. The mobile device 800 may comprise a smartphone, tablet, smartwatch, or other portable computing device.

In some aspects, the processing subsystem 802 performs context encoding and similarity search operations. In the illustrated example, the processing subsystem 802 includes a CPU 804 and an NPU 806. The CPU 804 (Central Processing Unit) executes general-purpose instructions including operating system services and application logic. The NPU 806 (Neural Processing Unit) accelerates machine learning operations. In some implementations, the NPU 806 executes temporal encoding and vector similarity computations. In some aspects, the NPU 806 performs the first similarity search and the second similarity search within a budgeted time slice of at most 20 milliseconds. Thus, the mobile device 800 may achieve low-latency context encoding by offloading vector operations to the NPU 806.

In some aspects, the memory subsystem 808 stores data structures for proactive media curation. In the illustrated example, the memory subsystem 808 includes RAM 810 and flash storage 812. In some implementations, the RAM 810 stores a vector database and a ring buffer. The vector database may include a history space storing associations between context vectors and preference vectors, and a catalog space storing media vectors. The ring buffer serves as a warm path cache for recent sensor data, as described with respect to FIG. 6. In some aspects, the flash storage 812 stores ANN indices and preference history. The ANN indices may include HNSW graphs or IVF-PQ structures. In the illustrated example, an arrow labeled "Index Loading" indicates data transfer from flash storage 812 to RAM 810. An arrow labeled "Vector Operations" indicates bi-directional data transfer between the memory subsystem 808 and the processing subsystem 802. Thus, the mobile device 800 may perform efficient on-device similarity search by loading compressed indices into RAM 810.

In some aspects, the sensor array 814 collects ambient context data from the environment. In the illustrated example, the sensor array 814 includes a GPS/GNSS sensor 816, an accelerometer 818, a gyroscope 820, a microphone 822, and an ambient light sensor 824. In some implementations, the GPS/GNSS sensor 816 provides location data for geofence detection. An arrow labeled "Location/Geofence" indicates data flow from the GPS/GNSS sensor 816 to the processing subsystem 802. In some aspects, the accelerometer 818 and gyroscope 820 provide motion data for activity recognition and velocity estimation. An arrow labeled "Activity/Velocity" indicates data flow from the accelerometer 818 and gyroscope 820 to the processing subsystem 802. In some implementations, the microphone 822 provides ambient sound data. The annotation "(dB level only)" indicates that raw audio frames are discarded and only logarithmic sound pressure levels are retained, as described with respect to the privacy filter 214 in FIG. 2. An arrow labeled "Ambient Sound (Privacy-Filtered)" indicates data flow from the microphone 822 to the processing subsystem 802. In some aspects, the ambient light sensor 824 detects illuminance levels for ambient light band conditions. A bracket on the left side of the diagram labeled "Ambient Context Data" encompasses the sensor array 814. Thus, the mobile device 800 may detect composite event triggers by collecting heterogeneous sensor readings from the sensor array 814.

In some aspects, the connectivity interfaces 826 enable communication with external services. In the illustrated example, the connectivity interfaces 826 include Wi-Fi 828, cellular 830, and Bluetooth 832. In some implementations, the Wi-Fi 828 and cellular 830 interfaces transmit playback requests to an external media service API 834. The external media service API 834 is depicted as a cloud shape outside the mobile device 800 boundary. In some aspects, the Bluetooth 832 interface detects audio device connections. The annotation "Audio Device Detection" indicates that the Bluetooth 832 interface provides device-state information for composite trigger detection. An arrow labeled "Bluetooth Audio Path" indicates an audio connection from the Bluetooth 832 interface to the audio output 842. Thus, the mobile device 800 may issue playback requests to external services and detect connected audio devices via the connectivity interfaces 826.

In some aspects, the power management 836 enforces energy budget constraints. In the illustrated example, the power management 836 includes a battery 838 and a PMIC 840. The PMIC 840 (Power Management Integrated Circuit) regulates power distribution to device components. The annotation "Energy Budget Enforcement" indicates that the power management 836 supports the energy management state machine described with respect to FIG. 6. An arrow labeled "Power State, Charging Status" indicates data flow from the power management 836 to the system bus 852. In some implementations, charging state information serves as a device-state predicate for composite trigger detection and safety policy evaluation. Thus, the mobile device 800 may operate within energy and latency budgets by coordinating with the power management 836.

In some aspects, the display 850 provides visual output and screen state information. The annotation "Screen State Detection" indicates that the display 850 provides device-state information. In some implementations, a screen-off state serves as a device-state predicate that may be satisfied before issuing a playback request, as described with respect to the policy engine 228 in FIG. 2.

In some aspects, the audio output 842 delivers media content to the user. In the illustrated example, the audio output 842 includes a DAC 844, an amplifier 846, and a speaker 848. The DAC 844 (Digital-to-Analog Converter) converts digital audio signals to analog form. The amplifier 846 increases signal power for the speaker 848. In some implementations, audio may alternatively be routed via the Bluetooth Audio Path to connected wireless headphones or earbuds, as indicated by the arrow from Bluetooth 832 to audio output 842.

In some aspects, the system bus 852 interconnects the hardware subsystems. In the illustrated example, the system bus 852 spans horizontally across the diagram, connecting the processing subsystem 802, memory subsystem 808, sensor array 814, connectivity interfaces 826, power management 836, display 850, and audio output 842. In some implementations, the system bus 852 comprises one or more data buses, address buses, and control buses.

In the illustrated example, three dashed boundary regions indicate software-to-hardware mapping. A first dashed region labeled "Perception Layer" 210 encompasses the sensor array 814. The perception layer 210, as described with respect to FIG. 2, receives ambient context data and detects composite event triggers. A second dashed region labeled "Cognition Layer" 216 encompasses the processing subsystem 802 and the memory subsystem 808. The cognition layer 216, as described with respect to FIG. 2, performs context encoding and two-stage similarity search. A third dashed region labeled "Action Layer" 226 encompasses the connectivity interfaces 826. The action layer 226, as described with respect to FIG. 2, enforces safety policies and issues playback requests. Thus, the mobile device 800 may implement the autonomous agent architecture of FIG. 2 using the hardware components depicted in FIG. 8.

In some aspects, the hardware architecture of FIG. 8 supports the proactive media curation method described with respect to FIG. 7. The sensor array 814 collects ambient context data at block 704. The processing subsystem 802 and memory subsystem 808 perform context encoding at block 708, first similarity search at block 710, target media profile computation at block 714, and second similarity search at block 716. The connectivity interfaces 826 issue the playback request at block 722. Thus, the mobile device 800 provides a physical implementation for the claimed method of proactive media curation.

In some implementations, the sensor array 814 implements block 704 of method 700. The GPS/GNSS sensor 816 provides location data corresponding to the geofence boundary 114 of FIG. 1. The accelerometer 818 and gyroscope 820 provide motion data corresponding to the activity indicator 120 and velocity indicator 122 of FIG. 1. The microphone 822 provides ambient sound pressure levels. The ambient light sensor 824 provides illuminance readings. The Bluetooth 832 interface provides device connection state corresponding to the Bluetooth audio indicator 124 of FIG. 1. The PMIC 840 provides charging status, and the display 850 provides screen state. In some aspects, sensor readings are stored in the ring buffer within RAM 810, as described with respect to FIG. 6.

In some implementations, the CPU 804 implements block 706 of method 700. The CPU 804 executes the event trigger module 212 and privacy filter/hysteresis logic 214 described with respect to FIG. 2. The CPU 804 evaluates composite trigger conditions based on data from the sensor array 814, Bluetooth 832, PMIC 840, and display 850. In some aspects, the CPU 804 applies hysteresis 422, debounce windows 434, and sustained timer 436 logic as described with respect to FIG. 4.

In some implementations, the NPU 806 implements block 708 of method 700. The NPU 806 executes the temporal encoder 608 described with respect to FIG. 6. The NPU 806 retrieves windowed sensor data from the ring buffer in RAM 810. The NPU 806 produces a context vector $V_{ctx}$ 610 as a fixed-length embedding. In some aspects, the NPU 806 completes encoding within the compute budget 612 of less than 20 milliseconds.

In some implementations, the NPU 806 and RAM 810 implement block 710 of method 700. The NPU 806 queries the history space, such as history space 222 or history space 320, stored in RAM 810 using the context vector. In some aspects, the NPU 806 performs cosine similarity computations using HNSW indices loaded from flash storage 812. The first similarity search corresponds to Search Stage 1 depicted in FIG. 3.

In some implementations, the RAM 810 implements block 712 of method 700. The RAM 810 stores the history space containing associations between context vectors and preference vectors $V_{pref}$ 322 described with respect to FIG. 3. In some aspects, the preference vectors are retrieved based on similarity scores computed by the NPU 806.

In some implementations, the NPU 806 implements block 714 of method 700. The NPU 806 executes the target generation module 330 described with respect to FIG. 3. The NPU 806 computes the target media profile vector $V_{target}$ 332 by combining preference vectors with constraint vectors representing BPM range, energy, mood, and recency.

In some implementations, the NPU 806 and RAM 810 implement block 716 of method 700. The NPU 806 queries the catalog space 224/340 stored in RAM 810 using the target media profile vector. In some aspects, the NPU 806 performs approximate nearest neighbor search using IVF-PQ indices loaded from flash storage 812. The second similarity search corresponds to Search Stage 2 depicted in FIG. 3.

In some implementations, the RAM 810 and CPU 804 implement block 718 of method 700. The RAM 810 stores the catalog space containing media vectors $V_{media}$ 342. The CPU 804 filters candidate media vectors by availability and locale constraints. In some aspects, the CPU 804 applies explicit content filtering based on user preferences.

In some implementations, the connectivity interfaces 826 implement block 722 of method 700. The CPU 804 executes the policy engine 228 and API execution module 230 described with respect to FIG. 2. The CPU 804 verifies safety and consent policies using state information from the Bluetooth 832, PMIC 840, and display 850. Upon policy verification, the Wi-Fi 828 or cellular 830 interface transmits the playback request to the external media service API 834. In some aspects, the playback request is issued without receiving an explicit user interface command, corresponding to the no manual input indicator 144 of FIG. 1.

In some implementations, the audio output 842 delivers media content following issuance of the playback request. The external media service API 834 returns an audio stream via Wi-Fi 828 or cellular 830. The DAC 844 converts digital audio to analog form. The amplifier 846 drives the speaker 848. Alternatively, audio may be routed via Bluetooth 832 to connected wireless headphones, corresponding to the automatic playback 118 of FIG. 1.

In some implementations, the power management 836 enforces energy budget constraints throughout method 700. The PMIC 840 coordinates with the energy management state machine 620 described with respect to FIG. 6. The PMIC 840 transitions the mobile device 800 among idle, active, and suspend states. In some aspects, the PMIC 840 enforces the time slice 632 constraint of at most 20 milliseconds for active processing.

Note that FIG. 8 is just one example of a processing system consistent with aspects described herein, and other processing systems having additional, alternative, or fewer components are possible consistent with this disclosure.

Implementation examples are described in the following numbered clauses:

Clause 1: A method for proactive media curation, the method comprising: collecting, via at least one sensor of a mobile device, ambient context data; detecting a composite event trigger based on the ambient context data; encoding the ambient context data into a context vector; performing a first similarity search in a history space of a device-resident vector database to retrieve one or more preference vectors, wherein the device-resident vector database is stored in a memory of the mobile device and comprises the history space storing associations between context vectors and preference vectors and a catalog space storing media vectors; computing a target media profile vector from the one or more preference vectors; performing a second similarity search in the catalog space using the target media profile vector to identify one or more media vectors; and issuing, without receiving an explicit user interface command, a playback request to an external media service to initiate media playback corresponding to the identified one or more media vectors.

Clause 2: The method of Clause 1, wherein the first similarity search employs a first distance metric and the second similarity search employs a second distance metric different from the first distance metric.

Clause 3: The method of Clause 2, wherein the first distance metric comprises cosine similarity and the second distance metric comprises inner product similarity or Euclidean distance.

Clause 4: The method of any one of Clauses 1-3, wherein the device-resident vector database employs an approximate nearest neighbor index selected from hierarchical navigable small world graphs and inverted file product quantization.

Clause 5: The method of Clause 4, wherein the history space is indexed using a hierarchical navigable small world graph and the catalog space is indexed using inverted file product quantization.

Clause 6: The method of any one of Clauses 1-5, wherein the composite event trigger comprises a conjunction of at least two conditions selected from: geofence entry or exit, activity transition, velocity threshold, ambient light band, ambient sound pressure band, Bluetooth connection state, and charging state.

Clause 7: The method of Clause 6, wherein the composite event trigger comprises a conjunction of at least three conditions.

Clause 8: The method of any one of Clauses 6-7, wherein the composite event trigger comprises a geofence exit, an activity transition to running, and a velocity exceeding a threshold.

Clause 9: The method of any one of Clauses 1-8, further comprising executing an autonomous headless agent that operates as a background service without graphical user interface interaction.

Clause 10: The method of Clause 9, wherein the autonomous headless agent is awakened by an operating system broadcast upon detection of the composite event trigger.

Clause 11: The method of any one of Clauses 1-10, wherein the ambient context data is processed exclusively on the mobile device and raw context data is not transmitted off-device.

Clause 12: The method of Clause 11, wherein the ambient context data comprises privacy-reduced representations that exclude raw audio frames and precise coordinates.

Clause 13: The method of Clause 12, wherein the privacy-reduced representations comprise logarithmic sound pressure levels and bucketized location data.

Clause 14: The method of any one of Clauses 1-13, wherein detecting the composite event trigger employs hysteresis and debounce windows to suppress false positives.

Clause 15: The method of Clause 14, wherein the hysteresis comprises a geofence radius hysteresis of at least 25 meters or a velocity hysteresis of at least 1 kilometer per hour.

Clause 16: The method of any one of Clauses 14-15, wherein detecting the composite event trigger requires sustained satisfaction of trigger conditions for a time window between 3 seconds and 10 seconds.

Clause 17: The method of any one of Clauses 1-16, wherein issuing the playback request is preceded by a confirmation backoff interval during which the composite event trigger is reevaluated, the confirmation backoff interval being between 1 second and 2 seconds.

Clause 18: The method of any one of Clauses 1-17, further comprising transitioning one or more processors of the mobile device among idle, active, and suspend states according to an energy management policy.

Clause 19: The method of Clause 18, wherein performing the first similarity search and the second similarity search occurs within a budgeted time slice of at most 20 milliseconds.

Clause 20: The method of any one of Clauses 18-19, further comprising operating in an event-triggered wakeup mode rather than a polling mode.

Clause 21: The method of any one of Clauses 1-20, further comprising enforcing a safety and consent policy prior to issuing the playback request.

Clause 22: The method of Clause 21, wherein the safety and consent policy gates the playback request upon verifying that a user consent flag is enabled, a current time is outside a quiet hours interval, and a device state predicate is satisfied.

Clause 23: The method of any one of Clauses 21-22, wherein a safety mode causes preview playback or notification instead of automatic playback.

Clause 24: The method of any one of Clauses 1-23, wherein the history space and the catalog space are stored in distinct memory pools with independent eviction policies.

Clause 25: The method of Clause 24, wherein the history space employs a least-recently-used eviction policy and the catalog space employs a popularity-aware eviction policy.

Clause 26: The method of any one of Clauses 1-25, further comprising encrypting vectors stored in the device-resident vector database using a device-scoped key.

Clause 27: The method of Clause 26, further comprising rotating the vectors after a retention period with tombstoning of expired entries.

Clause 28: The method of any one of Clauses 1-27, further comprising logging outcome signals including skip rate and completion rate and updating associations in the history space based on the outcome signals.

Clause 29: The method of Clause 28, wherein the associations are updated exclusively on-device without transmitting outcome signals off-device.

Clause 30: The method of any one of Clauses 1-29, wherein the target media profile vector encodes constraints comprising at least one of: tempo range, musical key, energy score, mood label, recency weighting, or explicit content filtering.

Clause 31: The method of any one of Clauses 1-30, wherein the target media profile vector is computed as a weighted combination of the one or more preference vectors and one or more constraint vectors.

Clause 32: The method of any one of Clauses 1-31, wherein encoding comprises summarizing time-series sensor data using a temporal encoder selected from an autoencoder, a recurrent neural network, and a transformer to produce the context vector as a fixed-length embedding.

Clause 33: The method of Clause 32, wherein encoding includes temporal downsampling to a fixed window length between 4 seconds and 8 seconds.

Clause 34: The method of any one of Clauses 1-33, wherein an end-to-end decision latency of less than 50 milliseconds is achieved from detection of the composite event trigger to issuance of the playback request.

Clause 35: The method of any one of Clauses 1-34, wherein the playback request comprises one of: a start playback command, a resume playback command, a queue creation command, or a playlist generation command.

Clause 36: The method of any one of Clauses 1-35, further comprising evaluating an energy budget predicate and a time-slice limit as prerequisites to performing the second similarity search.

Clause 37: The method of Clause 36, further comprising encrypting stored context vectors and preference vectors with a device-scoped key and rotating the vectors according to a retention policy.

Clause 38: The method of any one of Clauses 36-37, wherein detecting comprises applying hysteresis to a conjunction of geofence exit, activity transition, and velocity threshold sustained for at least a time window.

Clause 39: The method of any one of Clauses 36-38, wherein issuing the playback request is performed only upon verifying that a user consent flag is enabled, a current time is outside a quiet-hours interval, and a device-state predicate is satisfied.

Clause 40: A processing system, comprising: a memory comprising computer-executable instructions; and a processor configured to execute the computer-executable instructions and cause the processing system to perform a method in accordance with any one of Clauses 1-39.

Clause 41: A processing system, comprising means for performing a method in accordance with any one of Clauses 1-39.

Clause 42: A non-transitory computer-readable medium storing program code for causing a processing system to perform the steps of any one of Clauses 1-39.

Clause 43: A computer program product embodied on a computer-readable storage medium comprising code for performing a method in accordance with any one of Clauses 1-39.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system for proactive media curation, comprising:

a mobile device including one or more processors, a memory, and at least one sensor configured to provide ambient context data;

a device-resident vector database stored in the memory, the vector database comprising a history space storing associations between context vectors and preference vectors and a catalog space storing media vectors;

wherein the one or more processors execute an autonomous headless agent that operates as a background service, the autonomous headless agent configured to:

register with an operating system of the mobile device to receive broadcasts corresponding to context changes;

in response to at least one broadcast, transition from an idle state to an active state and receive the at least one broadcast;

based on the at least one broadcast, obtain the ambient context data and detect a composite event trigger based on the ambient context data, the composite event trigger comprising a conjunction of at least two conditions selected from: geofence entry or exit, activity transition, velocity threshold, ambient light band, ambient sound pressure band, Bluetooth connection state, and charging state;

encode the ambient context data into a context vector;

perform a first similarity search in the history space using the context vector to retrieve one or more preference vectors;

compute a target media profile vector from the one or more preference vectors;

perform a second similarity search in the catalog space using the target media profile vector to identify at least one media vector; and automatically issue a playback request to an external media service to initiate media playback corresponding to the at least one identified media vector, wherein the playback request comprises one or more media identifiers associated with the at least one identified media vector.

2. The system of claim 1, wherein the first similarity search employs a first distance metric and the second similarity search employs a second distance metric different from the first distance metric.

3. The system of claim 2, wherein the first distance metric comprises cosine similarity and the second distance metric comprises inner product similarity or Euclidean distance.

4. The system of claim 1, wherein the device-resident vector database employs an approximate nearest neighbor index selected from hierarchical navigable small world graphs and inverted file product quantization.

5. The system of claim 4, wherein the history space is indexed using a hierarchical navigable small world graph and the catalog space is indexed using inverted file product quantization.

6. The system of claim 1, wherein the autonomous headless agent transitions from an idle state to an active state in response to detected trigger events corresponding to the composite event trigger, and returns to the idle state after issuing the playback request.

7. The system of claim 1, wherein the memory further stores a ring buffer configured to continuously store recent sensor signals from the at least one sensor as a warm-path cache, and wherein encoding the ambient context data comprises obtaining a window of the sensor signals from the ring buffer, the window having a duration between 4 seconds and 8 seconds.

8. The system of claim 1, wherein, in response to detection of the composite event trigger, the autonomous headless agent performs the encoding, the first similarity search, and the second similarity search within a budgeted time slice of at most 20 milliseconds.

9. The system of claim 1, wherein detection of the composite event trigger employs hysteresis and debounce windows to suppress false positives, wherein the hysteresis comprises at least one of a geofence radius hysteresis of at least 25 meters or a velocity hysteresis of at least 1 kilometer per hour.

10. The system of claim 9, wherein detection of the composite event trigger requires sustained satisfaction of trigger conditions for a time window between 3 seconds and 10 seconds.

11. The system of claim 1, wherein issuing the playback request is preceded by a confirmation backoff interval during which the composite event trigger is reevaluated, the confirmation backoff interval being between 1 second and 2 seconds.

12. The system of claim 1, wherein the ambient context data is processed exclusively on the mobile device.

13. The system of claim 12, wherein the ambient context data comprises privacy-reduced representations that exclude raw audio frames and precise coordinates, and wherein the privacy-reduced representations comprise logarithmic sound pressure levels and bucketized location data.

14. The system of claim 1, wherein the one or more processors enforce a safety and consent policy prior to issuing the playback request, wherein the safety and consent policy gates the playback request upon verifying that a user consent flag is enabled, a current time is outside a quiet hours interval, and a device state predicate is satisfied.

15. The system of claim 1, wherein the target media profile vector encodes constraints comprising at least one of: tempo range, musical key, energy score, mood label, recency weighting, or explicit content filtering.

16. The system of claim 1, wherein the target media profile vector is computed as a weighted combination of the one or more preference vectors and one or more constraint vectors.

17. The system of claim 1, wherein encoding comprises summarizing time-series sensor data using a temporal encoder selected from an autoencoder, a recurrent neural network, and a transformer to produce the context vector as a fixed-length embedding.

18. The system of claim 1, wherein encoding includes temporal downsampling to a fixed window length between 4 seconds and 8 seconds.

* * * * *